US012640841B2

(12) United States Patent
Sugai et al.

(10) Patent No.: US 12,640,841 B2
(45) Date of Patent: May 26, 2026

(54) INFORMATION PROCESSING DEVICE AND DECODING METHOD

(71) Applicant: SONY GROUP CORPORATION, Tokyo (JP)

(72) Inventors: Ren Sugai, Tokyo (JP); Hiroki Matsuda, Tokyo (JP); Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 553 days.

(21) Appl. No.: 18/042,524

(22) PCT Filed: Aug. 12, 2021

(86) PCT No.: PCT/JP2021/029734
§ 371 (c)(1),
(2) Date: Feb. 22, 2023

(87) PCT Pub. No.: WO2022/050019
PCT Pub. Date: Mar. 10, 2022

(65) Prior Publication Data
US 2023/0327800 A1 Oct. 12, 2023

(30) Foreign Application Priority Data
Sep. 2, 2020 (JP) ................................. 2020-147862

(51) Int. Cl.
*H04L 1/00* (2006.01)

(52) U.S. Cl.
CPC .................................. *H04L 1/0045* (2013.01)

(58) Field of Classification Search
None
See application file for complete search history.

(56) References Cited

U.S. PATENT DOCUMENTS

2008/0294970 A1* 11/2008 Gross ................. H03M 13/1102
714/801
2010/0050054 A1* 2/2010 Abraham .............. H04L 1/0072
714/776
(Continued)

FOREIGN PATENT DOCUMENTS

JP H03253122 A 11/1991
WO 2010/087197 A1 8/2010
WO 2017/026198 A1 2/2017

OTHER PUBLICATIONS

Ranganath Vutukuru Mythili, "Physical Layer-Aware Wireless Link Layer Protocols", Ph.D. Thesis, Computer Science and Engineering Indian Institute of Technology, Massachusetts Institute of Technology, MIT Libraries, Jun. 1, 2010, 134 pages.
(Continued)

*Primary Examiner* — Gregory B Sefcheck
(74) *Attorney, Agent, or Firm* — CHIP LAW GROUP

(57) ABSTRACT

Provided are an information processing device and a decoding method that implement low-latency communication. An information processing device of the present disclosure includes: a first processing unit that performs decoding in a first protocol layer and provides likelihood information obtained by the decoding to a second protocol layer; and a second processing unit that performs decoding in the second protocol layer on the basis of the likelihood information.

14 Claims, 28 Drawing Sheets

(56) References Cited

U.S. PATENT DOCUMENTS

| | | | | |
|---|---|---|---|---|
| 2010/0205511 A1* | 8/2010 | Murakami | ........ | H03M 13/6362 |
| | | | | 714/781 |
| 2010/0269009 A1* | 10/2010 | Okamura | .......... | H03M 13/6527 |
| | | | | 714/752 |
| 2010/0316380 A1* | 12/2010 | de Lind van Wijngaarden | .......... | H04Q 11/0066 |
| | | | | 398/58 |
| 2011/0093759 A1* | 4/2011 | Song | .................... | H03M 13/13 |
| | | | | 714/756 |
| 2011/0268200 A1* | 11/2011 | Yonge, III | .......... | H04L 25/0232 |
| | | | | 375/259 |
| 2014/0208183 A1 | 7/2014 | Mahdavifar et al. | | |
| 2015/0016426 A1* | 1/2015 | Merlin | .............. | H04W 72/0466 |
| | | | | 370/335 |
| 2016/0204873 A1* | 7/2016 | Perez De Aranda Alonso | ............ | |
| | | | | H04B 10/2581 |
| | | | | 398/186 |
| 2016/0294512 A1 | 10/2016 | Noh et al. | | |
| 2017/0230149 A1* | 8/2017 | Wang | .................... | H04L 1/1819 |
| 2018/0167369 A1* | 6/2018 | Shapira | .............. | H04W 12/068 |
| 2020/0153547 A1* | 5/2020 | Latif | ..................... | H04L 1/1893 |
| 2020/0305164 A1* | 9/2020 | Yang | ..................... | H04L 5/0007 |
| 2021/0050952 A1* | 2/2021 | Noh | ........................ | H04L 1/189 |
| 2021/0126743 A1* | 4/2021 | Shabdanov | ........... | H04L 1/0075 |
| 2021/0160843 A1* | 5/2021 | Yang | .................... | H04L 1/0091 |
| 2021/0336719 A1* | 10/2021 | Xin | ....................... | H04L 1/0071 |
| 2022/0069949 A1* | 3/2022 | Shilo | ........................ | H04L 1/08 |
| 2022/0123901 A1* | 4/2022 | Lopez | ................. | H03M 13/255 |
| 2023/0133677 A1* | 5/2023 | Sun | ........................ | H04L 1/0041 |
| | | | | 370/328 |
| 2023/0208542 A1* | 6/2023 | Krampl | ..................... | H04L 1/08 |
| | | | | 398/43 |

OTHER PUBLICATIONS

"Multiplexing and channel coding", 3rd Generation Partnership Project, Technical Specification Group Radio Access Network, NR; 3GPP TS 38.212, Version 15.7.0, Release 15, Sep. 2019, 101 pages.
International Search Report and Written Opinion of PCT Application No. PCT/JP2021/029734, issued on Oct. 26, 2021, 09 pages of ISRWO.

* cited by examiner

: SYMBOL DELIMITER

*FIG. 20*

SYMBOL HEADER

| 1st FEC Indicator | 1st FEC Type | 1st FEC Length | Num. of 1st FEC symbol | No_CRC | Symbol delimiter |

: SYMBOL HEADER

: SYMBOL DELIMITER

INFORMATION PROCESSING DEVICE AND DECODING METHOD

CROSS REFERENCE TO RELATED APPLICATIONS

This application is a U.S. National Phase of International Patent Application No. PCT/JP2021/029734 filed on Aug. 12, 2021, which claims priority benefit of Japanese Patent Application No. JP 2020-147862 filed in the Japan Patent Office on Sep. 2, 2020. Each of the above-referenced applications is hereby incorporated herein by reference in its entirety.

TECHNICAL FIELD

The present disclosure relates to an information processing device and a decoding method.

BACKGROUND ART

Wireless access schemes and wireless networks for cellular mobile communication (hereinafter, also referred to as "Long Term Evolution (LTE)", "LTE-Advanced (LTE-A)", "LTE-Advanced Pro (LTE-A Pro)", "Evolved Universal Terrestrial Radio Access (EUTRA)", "New Radio (NR)", "New Radio Access Technology (NRAT)", or "Further EUTRA (FEUTRA)") are under review in the 3rd Generation Partnership Project (3GPP). Note that, in the following description, LTE includes LTE-A, LTE-A Pro, and EUTRA, and NR includes NRAT and FEUTRA.

In LTE, a base station device (base station) is also referred to as an evolved NodeB (eNodeB), and in NR, a base station device (base station) is also referred to as a gNodeB. In LTE and NR, a terminal device (mobile station, mobile station device, or terminal) is also referred to as user equipment (UE).

LTE and NR are cellular communication systems in which a plurality of areas covered by base stations is arranged in cell shapes. A single base station may manage multiple cells. In the NR, in addition to an enhanced mobile broadband (eMBB) of conventional data communication of smartphones, it is assumed that one wireless system supports various communication use cases such as ultra-reliable and low latency communication (URLLC)) or the like, which requires high reliability and low latency, such as emergency message transmission used for automated driving or the like.

In URLLC in which a low latency requirement is high, a latency caused by retransmission is one of problems.

Non-Patent Document 1 discloses an error correction code related technique studied in NR.

Patent Document 1 discloses an invention for improving erasure correction capability by reusing symbols determined to have errors in a case where the number of symbols necessary for erasure correction is insufficient in an application layer. However, in the present invention, depending on the symbols to be reused, it is assumed that the erasure correction capability cannot be improved or the number of symbols required to implement erasure correction may increase. Therefore, in the invention disclosed in Patent Document 1, it is considered that retransmission latency cannot be reduced in many cases.

CITATION LIST

Patent Document

Patent Document 1: US 2016/0294512 A

Non-Patent Document

Non Patent Document 1: 3GPP TS 38.212 V15.7.0 (September 2019), "Multiplexing and channel coding (Release 15)"

SUMMARY OF THE INVENTION

Problems to be Solved by the Invention

The present disclosure provides an information processing device and a decoding method that reduce a retransmission latency.

Solutions to Problems

An information processing device of the present disclosure includes: a first processing unit that performs decoding in a first protocol layer and provides likelihood information obtained by the decoding to a second protocol layer; and a second processing unit that performs decoding in the second protocol layer on the basis of the likelihood information.

A decoding method of the present disclosure performs decoding in a first protocol layer, provides likelihood information obtained by the decoding to a second protocol layer, and performs decoding in the second protocol layer on the basis of the likelihood information.

BRIEF DESCRIPTION OF DRAWINGS

FIG. 2 is a diagram schematically illustrating encoding of a first FEC.

FIG. 7 is a diagram illustrating an example of a procedure of generating a data frame of the 3GPP standard using two-stage FEC encoding.

FIG. 20 is a diagram illustrating a format example of a symbol header.

MODE FOR CARRYING OUT THE INVENTION

Hereinafter, embodiments of the present disclosure will be described with reference to the drawings.

Configuration of Communication Network

Figure 1:
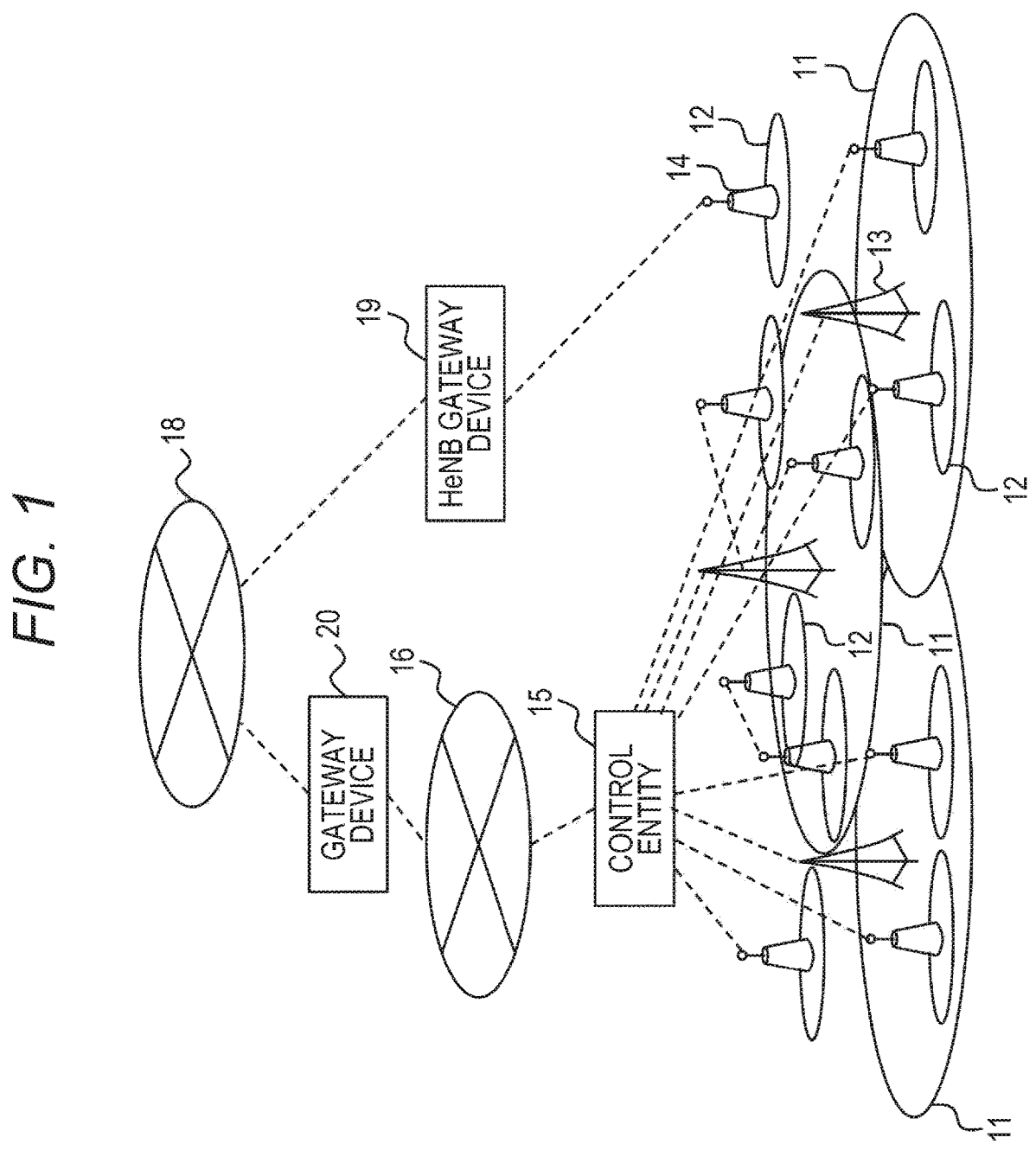
FIG. 1 is a diagram illustrating a configuration example of a communication network according to the present embodiment.

FIG. 1 illustrates a configuration example of a communication network according to the present embodiment. In FIG. 1, the propagation channels (lines) are indicated by broken lines. A line means a logical connection, and is not necessarily directly connected physically.

As a plurality of base stations, a macro cell base station 13 that provides a macro cell 11 and a small cell base station 14 that provides a small cell 12 smaller than the macro cell are included. In a case of being referred to as a base station, the base station may be either the macro cell base station 13 or the small cell base station 14. The macro cell 11 and the small cell 12 are communication areas (cells) in which each of a plurality of base stations provides services, and are indicated by ellipses in FIG. 1. One base station may provide a plurality of cells.

The base stations can communicate with each other via a backhaul (here, wired or wireless), and mainly exchange control information. In this backhaul, for example, information may be exchanged using a protocol of the X2 interface or the S1 interface. The topology of the backhaul between the base stations may be any type such as a mesh type, a star type, a ring type, or the like.

The base stations also have a backhaul with the core network. The base stations may be connected to a core network 16 by being connected to a control entity 15 (the control entity 15 may be regarded as one element of the core network 16). There may be a plurality of control entities 15.

Furthermore, the base stations may be connected to the core network 16 via an external network 18 in addition to via the control entity 15. Examples of such an external network 18 include a femto cell base station, a home eNodeB (HeNB) device, or the like that can be installed indoors or at home. One or more small cell base stations 14 are connected to the external network 18 via a HeNB gateway device 19. The external network 18 is connected to the core network 16 via a gateway device 20.

The small cell 12 is basically disposed so as to overlap with the macro cell 11. However, the small cell 12 may be disposed so as to partially overlap with the macro cell 11, or may be disposed completely outside the macro cell 11. A plurality of small cell base stations 14 may form a group (cluster). In the cluster, a base station having a role of a cluster head may be provided.

The radio resources (at least one of a frequency resource, a time resource, or a spatial resource) used in the macro cell 11 and the small cell 12 may have characteristics. For example, a same frequency resource F1 (or time resource T1) may be used by the macro cell 11 and the small cell 12. In this way, it is possible to improve the utilization efficiency of the radio resources as the entire system.

The macro cell 11 may use a frequency resource F1 (or a time resource T1), and the small cell 12 may use a frequency resource F2 (or a time resource T2). In this way, interference between the macro cell 11 and the small cell 12 can be avoided.

Further, both the frequency resources F1 and F2 (both the time resources T1 and T2) may be used by each of the macro cell 11 and the small cell 12. A method in which both frequency resources F1 and F2 are used by each of the macro cell 11 and the small cell 12 is similar in concept to carrier aggregation (CA).

Configuration of Transmission Device and Reception Device

In the present embodiment, on the transmission side, a plurality of error correction codes (FEC) is used to perform stepwise encoding on an information sequence to be transmitted. Specifically, as an example, for an information sequence, first FEC encoding is performed first using an erasure correction code that is a first code in a data link layer (second protocol layer), and second FEC encoding is performed second using a second code in a physical layer (first protocol layer) lower than the data link layer. In addition, the reception side acquires an information sequence by performing decoding on data received from the transmission side in a stepwise manner by a decoding scheme corresponding to each of a plurality of FECs. Specifically, decoding of the second FEC is performed first in the first protocol layer, and decoding of the first FEC is performed second in the second protocol layer.

Figure 2:
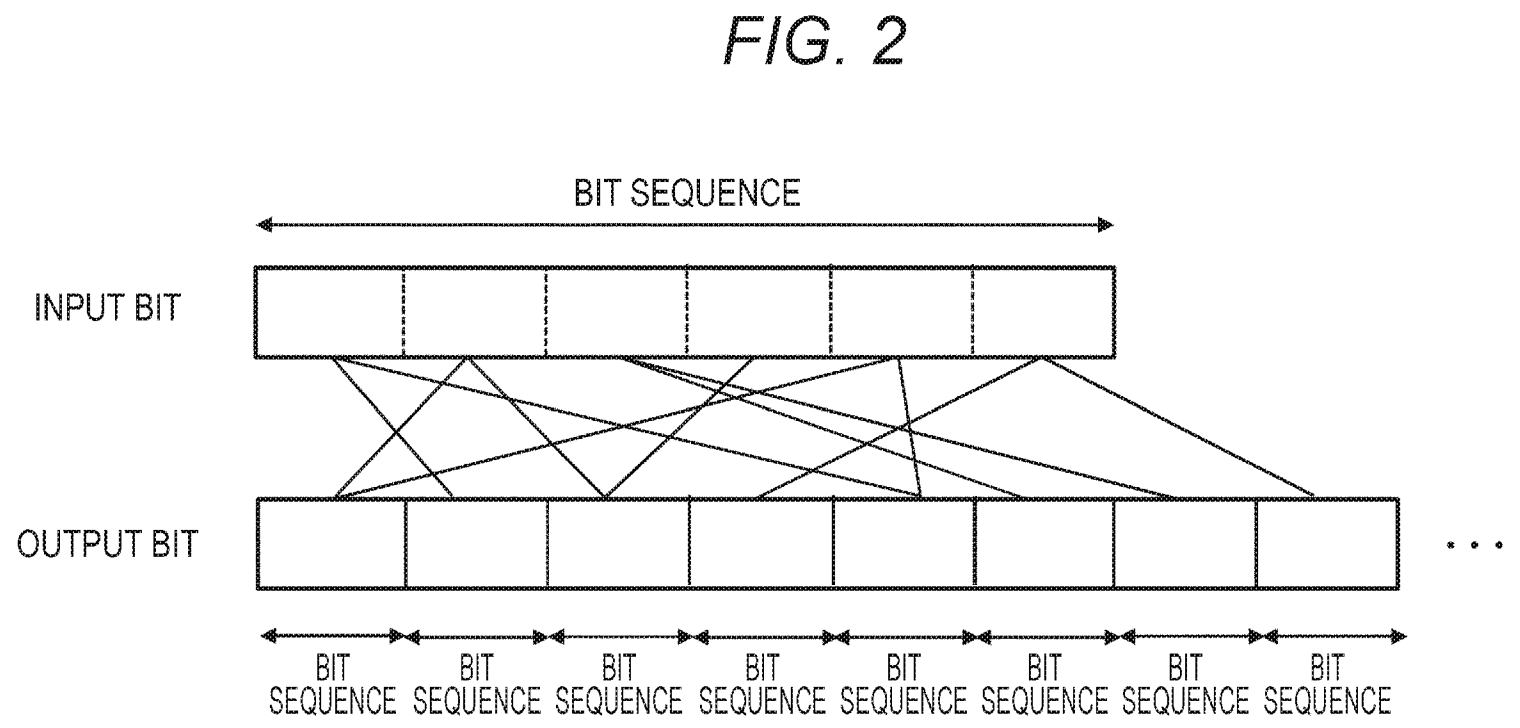

FIG. 2 is a diagram schematically illustrating encoding of the first FEC. In the encoding of the first FEC, one or a plurality of bit sequences to be output is generated from one input bit sequence. The plurality of generated bit sequences can be divided into two, that is, a bit sequence that needs to be transmitted to the reception side and a bit sequence that can be decoded at the reception side without being transmitted to the reception side. That is, even if the reception side does not receive all of the plurality of bit sequences, the original bit sequence to be an input can be restored.

The bit sequence input in FIG. 2 is represented by a plurality of rectangles, and each rectangle includes one or more bits. The plurality of output bit sequences is each indicated by one rectangle, and each bit sequence corresponds to an encoded symbol including one or more bits. Each bit sequence (encoded symbol) is generated on the basis of bits corresponding to one or more rectangles on the input side. The relationship between each bit sequence and the bits on the input side from which each bit sequence is generated is represented by straight lines connecting the rectangles on the input side and the rectangles on the output side.

An erasure correction code (erasure code) can be used as the code (first code) of the first FEC. Examples of the erasure correction code include an FEC method belonging to a category such as rateless codes, fountain codes, or the like, an FEC method of performing linear synthesis or XOR synthesis on a plurality of bit sequences to encode the bit sequences, or the like. Specific examples of the erasure correction code include rateless codes, fountain codes, Tornado codes, Luby transform (LT) codes, Raptor codes, RaptorQ codes, LDPC codes, BCH codes, RS codes, Zigzag decodable codes, ZD fountain codes, XOR codes, or the like.

Figure 3:
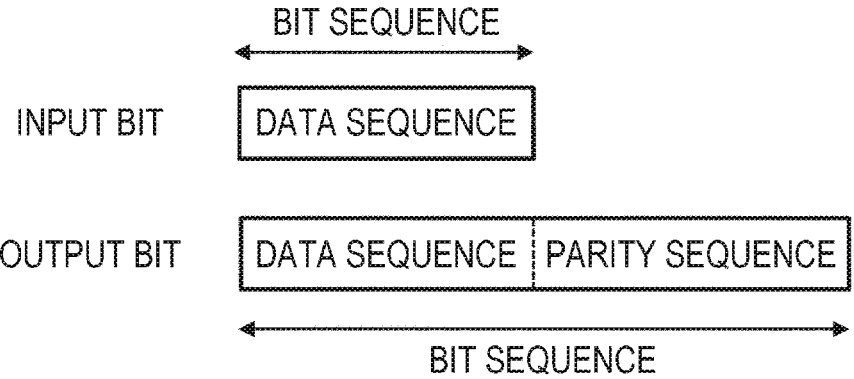
FIG. 3 is a diagram schematically illustrating encoding of a second FEC.

FIG. 3 is a diagram schematically illustrating encoding of the second FEC. In the encoding of the second FEC, one bit sequence to be output is generated from one input bit sequence. In the example of FIG. 3, the output bit string is generated by adding a parity sequence to the input bit sequence.

The code (second code) used for the second FEC include convolutional codes, turbo codes, low density parity check codes (LDPC codes), polar codes, or the like. However, the use of the erasure correction code as the code used for the second FEC is also not excluded.

Figure 4:
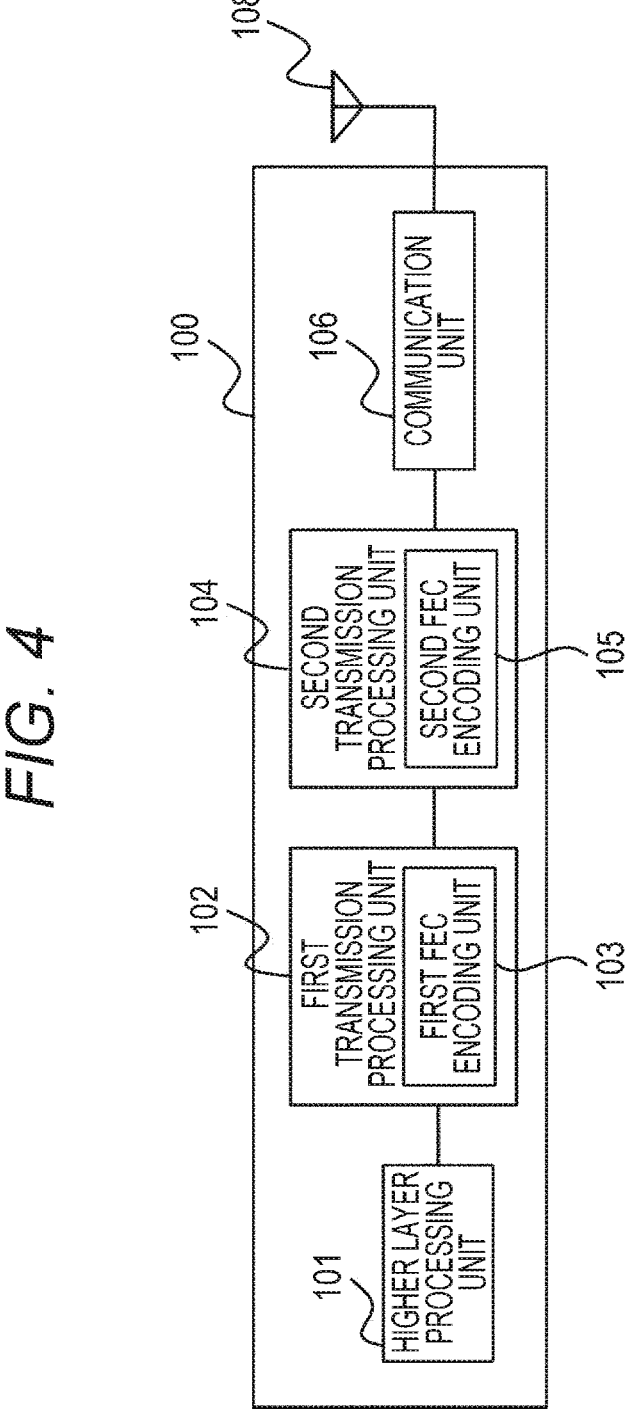
FIG. 4 is a block diagram schematically illustrating an example of a transmission device according to the present embodiment.

FIG. 4 is a block diagram schematically illustrating an example of a transmission device 100 according to the present embodiment. The transmission device 100 includes a higher layer processing unit 101, a first transmission processing unit 102, a second transmission processing unit 104, a communication unit 106, and an antenna 108. In the present embodiment, the transmission device 100 performs wireless communication, but a configuration for performing wired communication is also not excluded. In this case, the antenna 108 may not be provided.

The higher layer processing unit 101 performs processing related to a higher layer. The higher layer includes, for example, an application layer, a session layer, a presentation layer, a transport layer, and a network layer. The higher layer processing unit 101 executes an application, for example, and generates data to be transmitted to the reception device. The higher layer processing unit 101 provides the generated data to the first transmission processing unit 102. The higher layer processing unit 101 may provide additional information such as quality of service (QoS) information or the like to the first transmission processing unit 102 together with data. The quality of service information includes information such as, for example, an allowed transmission latency, a transmission bandwidth, a priority of data, an application type, or the like.

The first transmission processing unit 102 performs processing related to a data link layer. The data link layer corresponds to the second protocol layer as an example. Note that a part of processing of the data link layer may be performed by the higher layer processing unit 101. Alternatively, a part of processing of the higher layer may be performed by the first transmission processing unit 102. The first transmission processing unit 102 acquires the data provided from the higher layer processing unit 101 as the input bit sequence (information sequence to be transmitted and received) described in FIG. 2. The first transmission processing unit 102 includes a first FEC encoding unit 103 that performs encoding of the first FEC.

The first FEC encoding unit 103 generates coded data (coded data of the first FEC) by encoding the data input from the higher layer processing unit 101 with an erasure correction code that is a first code. The coded data is provided to the second transmission processing unit 104 that performs processing of the first protocol layer lower than the second protocol layer.

As an example, the first FEC encoding unit 103 divides the input data into a plurality of symbols by the symbol size of encoding (the symbol size of the first FEC). Then, a plurality of pieces of coded data (encoded symbols) is generated by encoding a plurality of symbols by the erasure correction code. The first FEC encoding unit 103 may add error detection information to each of the plurality of pieces of coded data. Examples of the error detection information include cyclic redundancy check (CRC, hereinafter CRC), syndrome, frame check sequence (FCS), and the like. The first transmission processing unit 102 provides the plurality of pieces of coded data to the second transmission processing unit 104. Alternatively, the first transmission processing unit 102 generates data in the format of the first protocol layer on the basis of the plurality of pieces of coded data, and provides the generated data to the second transmission processing unit 104.

As an example, in the case of the 3GPP standard, when the coded data matches the length to which the encoding of the second FEC is applied, the coded data may be provided as it is as data for generating a code block. In a case where coded data is longer than the length to which the encoding of the second FEC is applied, the coded data may be divided into two or more fragments, and each fragment may be provided as data for code block generation. In a case where the coded data is shorter than the length to which the encoding of the second FEC is applied, fragments may be concatenated between different pieces of coded data, and the concatenated fragments may be provided as data for code block generation. Data (data for code block generation) having a length to which the encoding of the second FEC is applied may be acquired by combining division and concatenation. The operation in the case of the 3GPP standard described here is an example, and details of the operation of the second transmission processing unit 104 in the case of the 3GPP standard will be described later in detail using a specific example.

As another example, in the case of the IEEE 802.11 standard, one or a plurality of medium access control (MAC) frames may be generated on the basis of a plurality of pieces of coded data, and the MAC frame may be provided to the second transmission processing unit 104. The MAC frame may be a MAC protocol data unit (MPDU) or an aggregated MPDU (A-MPDU). A MAC frame includes, for example, a MAC header, a frame body field, and an FCS. Main body data is stored in the frame body field. The main body data is generated on the basis of the coded data. The MAC frame may include one or more pieces of coded data. The coded data may be divided into two or more fragments to generate a MAC frame including a fragment. Two or more pieces of coded data may be concatenated as the main body data of the MAC frame. The main body data of the MAC frame may be generated by combining division and concatenation. Padding data may be added to the end of the MAC frame, and a service field may be added to the head. The operation in the case of the IEEE 802.11 standard described here is an example, and details of the operation of the second transmission processing unit 104 in the case of the 3GPP standard will be described later in detail using a specific example.

The first transmission processing unit 102 may decide at least one of the number of symbols or the symbol length to which the first FEC is applied on the basis of priority of data to be transmitted or information of an application. The priority of data or the information of the application is associated with at least one of the number of symbols or the symbol length to which the first FEC is applied in advance by association information such as a table or the like. At least one of the number of symbols or the symbol length is decided with reference to the table on the basis of the priority of data or the information of the application provided from the higher layer processing unit 101. The symbol size of the first FEC is decided on the basis of at least one of the decided number of symbols or the decided symbol length, and the input data is divided with the decided symbol size.

The first transmission processing unit 102 may decide at least one of the number of symbols or the symbol length to which the first FEC is applied on the basis of the quality information of the communication path between the transmission device 100 and a reception device 200. The communication quality may be, for example, the number of times of retransmission of data or coded data, an error rate of packets, a communication speed, a SINR, an RSSI, a latency request, a reliability request, or the like. As an example, the information of the communication quality is associated with at least one of the number of symbols or the symbol length to which the first FEC is applied in advance by association information such as a table or the like. At least one of the number of symbols or the symbol length to which the first FEC is applied is decided with reference to the table on the basis of the information of the measured communication quality. The symbol size of the first FEC is decided on the basis of at least one of the decided number of symbols or the decided symbol length, and data to be transmitted is divided with the decided symbol size. The measurement of the communication quality may be performed by the first transmission processing unit 102, the higher layer processing unit 101, the second transmission processing unit 104, or the communication unit 106.

The first transmission processing unit 102 may decide at least one of the number of symbols or the symbol length to which the first FEC is applied on the basis of the modulation scheme used for transmission by the communication unit 106, the coding rate of the second code, the coding rate of the first code, or a combination thereof. The modulation scheme, the coding rate of the second code, the coding rate of the first code, or a combination thereof is associated with, for example, at least one of the number of symbols or the symbol length to which the first FEC is applied in advance by association information such as a table or the like. At least one of the number of symbols or the symbol length to which the first FEC is applied is decided with reference to the table on the basis of the modulation scheme, the coding rate of the second code, the coding rate of the first code, or a combination thereof used in the communication unit 106. The symbol size of the first FEC is decided on the basis of at least one of the decided number of symbols or the decided symbol length, and data to be transmitted is divided with the decided symbol size. The modulation scheme, the coding rate of the second code, the coding rate of the first code, or a combination thereof may be decided by either the first transmission processing unit 102 or the second transmission processing unit 104.

The second transmission processing unit 104 performs processing related to the physical layer. The physical layer corresponds to the first protocol layer as an example. Note that a part of the processing of the physical layer may be performed by the first transmission processing unit 102. Alternatively, a part of the processing of the data link layer may be performed by the second transmission processing unit 104. The second transmission processing unit 104 includes a second FEC encoding unit 105. The second FEC encoding unit 105 encodes data including the coded data provided from the first transmission processing unit 102 using a second code. The second transmission processing unit 104 generates data to be transmitted to the reception device 200 on the basis of the data encoded with the second code. The second transmission processing unit 104 provides the generated data to the communication unit 106 as a data frame (transmission frame).

As an example, in the case of the 3GPP standard, the second FEC encoding unit 105 generates code blocks by performing encoding with the second code on the basis of the data provided from the first transmission processing unit 102. The second transmission processing unit 104 concatenates a plurality of code blocks into a transport block, and adds a CRC, which is error detection information, to the end of the transport block. If necessary, padding data is added after the CRC. The data after the padding data addition is provided to the communication unit 106 as a data frame. The operation in the case of the 3GPP standard described here is an example, and details of the operation of the second transmission processing unit 104 in the case of the 3GPP standard will be described later in detail using a specific example.

As another example, in the case of the IEEE 802.11 standard, the second FEC encoding unit 105 performs encoding with the second code on the basis of the MAC frame (MPDU or A-MPDU) provided from the first transmission processing unit 102. A service field and padding data may be added to the MAC frame. The second transmission processing unit 104 adds a physical header (PHY Header) which is a header of the physical layer to the encoded MAC frame to form a data frame of the physical layer, and provides the data frame of the physical layer to the communication unit 106. The operation in the case of the IEEE 802.11 standard described here is an example, and details of the operation of the second transmission processing unit 104 in the case of the IEEE 802.11 standard will be described later in detail using a specific example.

The communication unit 106 transmits the data provided from the second transmission processing unit 104 to the reception device via the antenna 108. More specifically, the communication unit 106 modulates the data with a modulation scheme used for transmission, and performs digital-to-analog (DA) conversion on the modulated data. The frequency of the converted analog signal is up-converted, and band filtering is performed according to the frequency of the radio resource used for transmission. The band-filtered signal is amplified, and a radio signal is transmitted from the antenna 108.

Here, the first transmission processing unit 102 may decide whether or not to perform the first FEC on the basis of the service quality request provided from the higher layer processing unit 101. In a case of deciding not to perform the first FEC, the first transmission processing unit 102 generates data (data for code block generation, MAC frame, or the like) to be provided to the second transmission processing unit 104 without performing encoding of the first FEC by the first FEC encoding unit 103. The first transmission processing unit 102 provides the generated data to the second transmission processing unit 104.

Furthermore, the first transmission processing unit 102 or the second transmission processing unit 104 may notify the reception device of information regarding the first FEC. The information regarding the first FEC includes, as an example, at least one of the information indicating that the encoding of the first FEC is performed, the type of the erasure correction code, the number of symbols and the symbol length to which the first FEC is applied, the index of the symbol to which the first FEC is applied, or the type and the length of the error detection information.

Furthermore, the first transmission processing unit 102 may include a delimiter (symbol delimiter) including information indicating a boundary of encoded symbols at the end or head of the coded data of the symbol size. In addition to the information indicating the boundary, the symbol delimiter may include information indicating the order number of an adjacent encoded symbol (the immediately preceding encoded symbol or the subsequent encoded symbol), information of the address of the transmission destination (destination) of the data frame, or the like.

Furthermore, the first transmission processing unit 102 may add a header including information regarding the first FEC to the coded data. The header may include the above-described symbol delimiter. Details of the configuration of the header will be described later. In addition, the second transmission processing unit 104 may add a header including information regarding the first FEC to the data of the physical layer.

Furthermore, the transmission device 100 may transmit the information regarding the first FEC at the time of a connection sequence performed at the time of initial connection with the reception device. Furthermore, the transmission device 100 may include information regarding the first FEC in the control information or the management information to be transmitted to the reception device. The control information may be information providing notification of a radio resource (a frequency resource, a time resource, a spatial resource, or a combination thereof) used for communication with the reception device. Furthermore, in a case where it is decided that the first FEC is performed from a state where the first FEC is not performed, the transmission device 100 may transmit information regarding the first FEC to the reception device. The transmission device 100 includes a notification unit that notifies the reception device of information regarding the first FEC. The notification unit may be included in the higher layer processing unit 101, the first transmission processing unit 102, the second transmission processing unit 104, or the communication unit 106.

Figure 5:
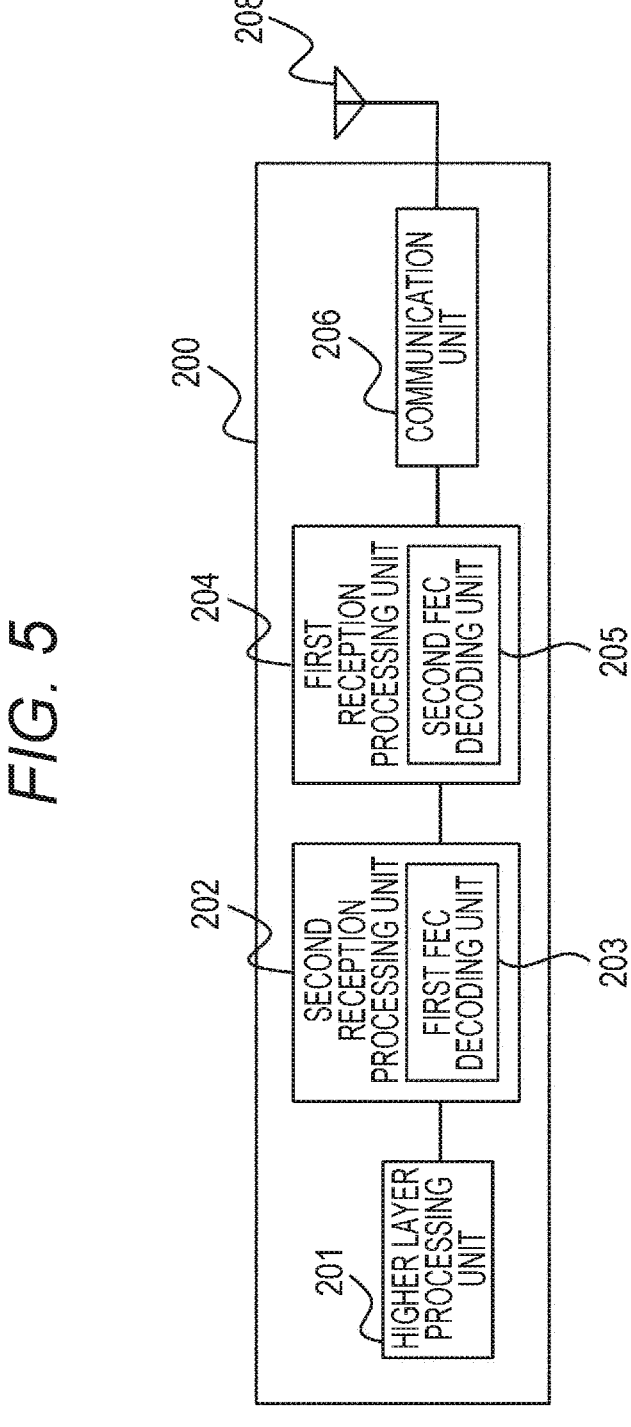
FIG. 5 is a block diagram schematically illustrating an example of a reception device according to the present embodiment.

FIG. 5 is a block diagram schematically illustrating an example of a reception device which is an information processing device according to the present embodiment. The reception device 200 includes a higher layer processing unit 201, a second reception processing unit (second processing unit) 202, a first reception processing unit (first processing unit) 204, a communication unit 206, and an antenna 208. In the present embodiment, the reception device 200 performs wireless communication, but a configuration for performing wired communication is also not excluded. In this case, the antenna 208 may not be provided.

The communication unit 206 receives a radio signal from the transmission device 100 via the antenna 208. The communication unit 206 performs low noise amplification on the received radio signal, performs frequency down-conversion, band filtering, and the like, and performs analog to digital (AD) conversion on the analog signal subjected to the band filtering. The digital signal obtained by the AD conversion is demodulated by a demodulation scheme corresponding to the modulation scheme used on the transmission side, and the demodulated data is provided to the first reception processing unit 204 as a data frame of the physical layer.

The first reception processing unit 204 (first processing unit) performs processing related to the physical layer (first protocol layer). The first reception processing unit 204 performs decoding in the physical layer (first protocol layer) and provides likelihood information obtained by the decoding to the second protocol layer. More specifically, it is as follows.

The first reception processing unit 204 acquires data of the physical layer from the communication unit 206. More specifically, the first reception processing unit 204 acquires a data frame which is data encoded by the erasure correction code which is the first code and further encoded by the second code from the communication unit 206. The first reception processing unit 204 includes a second FEC decoding unit 205.

The second FEC decoding unit 205 decodes the acquired data frame by a decoding scheme corresponding to the second code, and acquires decoded data of the second code (decoded data of the second FEC). At this time, the second FEC decoding unit 205 acquires at least bitwise likelihood information of coded data of the first code (coded data of the first FEC). That is, in the decoded data of the second code, bitwise likelihood information is calculated for at least a data portion corresponding to encoded symbols of the first FEC. The likelihood information is information calculated in the process of decoding processing, and is a value (likelihood) indicating whether the probability that the value of the information bit is "1" or the probability that the value is "0" is high. Specific examples of the likelihood information include a soft decision value, a log likelihood ratio (LLR), and the like. When the data frame is received, an analog signal of the data frame is sampled by an analog to digital (AD) converter, and amplitude of the sampled signal is quantized and converted into a digital signal. From the sign and amplitude of each bit of the digital signal, a value indicating whether the value of each bit has a high probability of being "1" or a high probability of being "0" is calculated as likelihood information. The second FEC decoding unit 205 performs hard decision on the calculated likelihood information of each bit to obtain decoded data (binary data) of the second FEC. In a case where the error detection information (such as CRC or the like) is added to the data frame, the first reception processing unit 204 performs CRC determination on the data frame.

The first reception processing unit 204 provides data including the acquired likelihood information to the second reception processing unit 202. At this time, for example, the first reception processing unit 204 provides the coded data of the first FEC (the data portion corresponding to the encoded symbols of the first FEC) in the data decoded by the second FEC to the second reception processing unit 202 in the state of the likelihood information. That is, the data portion corresponding to the encoded symbols of the first FEC in the data decoded by the second FEC is provided in the state of the likelihood information of the encoded symbol size of the first FEC. Furthermore, the first reception processing unit 204 may provide all of the decoded data of the second FEC to the second reception processing unit 202. The second FEC decoding unit 205 may provide likelihood information of data of a portion other than the coded data of the first FEC to the second reception processing unit 202. For example, in a case where the error detection information (CRC or the like) is added to the encoded symbols of the first FEC in the transmission device 100, the likelihood information of the portion corresponding to the error detection information may be provided to the second reception processing unit 202.

In a case where the error detection information (CRC or the like) is added to the coded data of the first FEC decoded by the second FEC decoding unit 205, the first reception processing unit 204 may perform CRC determination and provide a result of the CRC determination to the second reception processing unit 202.

As an example, in the case of the 3GPP standard, the first reception processing unit 204 performs CRC determination on the transport block included in the data frame. The second FEC decoding unit 205 divides a concatenation of code blocks included in the transport block into a plurality of fragments (code blocks), and performs decoding of the second FEC for each code block. The first reception processing unit 204 provides the second reception processing unit 202 with the decoded data of each code block in which the coded data of the first FEC is replaced with the likelihood information, with the result of CRC determination of the transport block. Alternatively, in a case where the result of the CRC determination is successful (OK), the decoded data of each code block (including the coded data of the first FEC) and the result of the CRC determination may be provided to the second reception processing unit 202 without providing the likelihood information to the second reception processing unit 202. In a case where CRC is added to the coded data of the first FEC, CRC determination may be performed, and a result of the CRC determination may be provided to the second reception processing unit 202. The operation in the case of the 3GPP standard described here is an example, and details of the operation of the first reception processing unit 204 in the case of the 3GPP standard will be described later in detail using a specific example.

As another example, in the case of the IEEE 802.11 standard, the first reception processing unit 204 processes the header (physical header) of the data frame of the physical layer. The first reception processing unit 204 performs decoding of the second FEC on the data after the physical header processing to acquire the MAC frame. A service field may be added to the MAC frame. As an example, the first reception processing unit 204 provides the second reception processing unit 202 with the coded data of the first FEC in the acquired MAC frame replaced with the likelihood information. The operation in the case of the IEEE 802.11 standard described here is an example, and details of the operation of the first reception processing unit 204 in the case of the IEEE 802.11 standard will be described later in detail using a specific example.

The second reception processing unit 202 (second processing unit) acquires data including at least likelihood information of the coded data of the first FEC from the first reception processing unit 204. The second reception processing unit 202 includes a first FEC decoding unit 203. On the basis of the data acquired from the first reception processing unit 204, the first FEC decoding unit 203 decodes the likelihood information (likelihood information for each encoded symbol of the first FEC) of the coded data of the first FEC by a decoding scheme corresponding to the first code (erasure correction code) (performs decoding of the first FEC). Specific examples of the decoding scheme using the likelihood information include a probability propagation method, a Peterson decoding method, a sum product method, a sweeping-out method, and a MAP algorithm. Any of these methods may be used, or other methods may be used. The first FEC decoding unit 203 may acquire information regarding the first FEC from the transmission device 100, and perform decoding on the basis of the acquired information.

In a case where the decoding of the first FEC by the first FEC decoding unit 203 is successful, the second reception processing unit 202 provides the decoded data of the first FEC to the higher layer processing unit 201. In a case where the decoding of the first FEC fails (in a case where there is an error in the decoded data), a retransmission request (automatic repeat request (ARQ), Hybrid ARQ (HARQ), or the like) is transmitted to the transmission device 100.

As an example, in the case of the 3GPP standard, in a case where the information of OK is acquired from the first reception processing unit 204 as a result of the CRC determination of the transport block, the second reception processing unit 202 determines that all the code blocks included in the transport block have been correctly received. The first FEC decoding unit 203 decodes the likelihood information (the likelihood information of the encoded symbols of the first FEC) included in the data provided from the first reception processing unit 204 by the first FEC, and provides the decoded data (correctly decoded) of the first FEC to the higher layer processing unit 201. Alternatively, as another method, since the result of the CRC determination is OK, the encoded symbols of the first FEC in the data decoded by the second FEC decoding unit 205 may be directly decoded instead of decoding the likelihood information.

In a case where the result of the CRC determination of the transport block is NG, the decoding of the first FEC is performed using the likelihood information included in the data provided from the first reception processing unit 204. For example, in a case where the data obtained by decoding a code block includes an encoded symbol of the first FEC, the likelihood information of the encoded symbol is acquired from the likelihood information of the data obtained by decoding the code block. In a case where the data obtained by decoding a code block includes a fragment of an encoded symbol of the first FEC, the likelihood information of the fragment is concatenated with the likelihood information of fragments included in data obtained by decoding other code blocks according to the size of the encoded symbols of the first FEC to acquire the likelihood information of the encoded symbols of the first FEC. The second FEC decoding unit 205 performs decoding of the second FEC using the acquired likelihood information of the encoded symbols of the first FEC.

In a case where the decoding of the first FEC is successful, the second reception processing unit 202 provides the decoded data of the first FEC to the higher layer processing unit 201. Furthermore, the second reception processing unit 202 transmits an acknowledgement response (ACK) to the transmission device 100.

In a case where the decoding of the first FEC has failed (in a case where there is an error in the decoded data or in a case where all the errors cannot be corrected), the second reception processing unit 202 transmits a retransmission request (ARQ, HARQ, or the like) to the transmission device 100 by using an acknowledgement response (NACK). For example, in a case where the CRCs are added to the encoded symbols of the first FEC, the retransmission request of the encoded symbols whose results of the CRC determinations are NG may be transmitted. Alternatively, a retransmission request of encoded symbols of the first FEC corresponding to an erroneous portion of the decoded data of the first FEC may be transmitted. The encoded symbols requested to be retransmitted may be decided by another method.

The operation described here is an example of the operation in the case of the 3GPP standard, and details of the operation of the second reception processing unit 202 in the case of the 3GPP standard will be described later using a specific example.

As another example, in the case of the IEEE 802.11 standard, the second reception processing unit 202 acquires the MAC frame from the first reception processing unit 204, processes the service field, and then determines the FCS for each MPDU. In a case where an encoded symbol of the first FEC is included in the main body portion of an MPDU, the second reception processing unit 202 acquires the likelihood information of the encoded symbol of the first FEC from the likelihood information of the main body portion. In a case where a fragment of an encoded symbol of the first FEC is included in the main body portion of an MPDU, the likelihood information of the fragment is concatenated with at least the likelihood information of fragments included in the main body portion of other MPDUs in accordance with the size of the encoded symbols of the first FEC to acquire the likelihood information of the encoded symbols of the first FEC.

In a case where the decoding of the first FEC is successful, the second reception processing unit 202 provides the decoded data of the first FEC to the higher layer processing unit 201. Furthermore, the second reception processing unit 202 transmits an acknowledgement response (ACK) to the transmission device 100.

In a case where the decoding of the first FEC has failed (in a case where there is an error in the decoded data or in a case where all the errors cannot be corrected), the second reception processing unit 202 transmits a retransmission request (ARQ, HARQ, or the like) to the transmission device 100 by using an acknowledgement response (NACK). For example, a retransmission request of encoded symbols of the first FEC at least partially included in MPDUs of which the results of the FCS determinations are NG is transmitted. Alternatively, a retransmission request of encoded symbols corresponding to an erroneous portion of the decoded data of the first FEC may be transmitted. The encoded symbols requested to be retransmitted may be decided by another method.

Note that, in a case where the results of the FCS determinations of all the MPDUs included in the MAC frame is OK, the decoded data of the second FEC (for example, the main body portion of the MPDUs) decoded by the second FEC decoding unit 205 may be directly decoded.

The operation described here is an example of the operation in the case of the IEEE 802.11 standard, and details of the operation of the second reception processing unit 202 in the case of the IEEE 802.11 standard will be described later using a specific example.

The higher layer processing unit 201 performs processing of the higher layer. For example, the higher layer processing unit 201 passes the data provided from the second reception processing unit 202 to the application.

The communication quality between the reception device 200 and the transmission device 100 may be measured by the reception device 200. In this case, the reception device 200 may transmit information of the measured communication quality to the transmission device 100.

Figure 6:
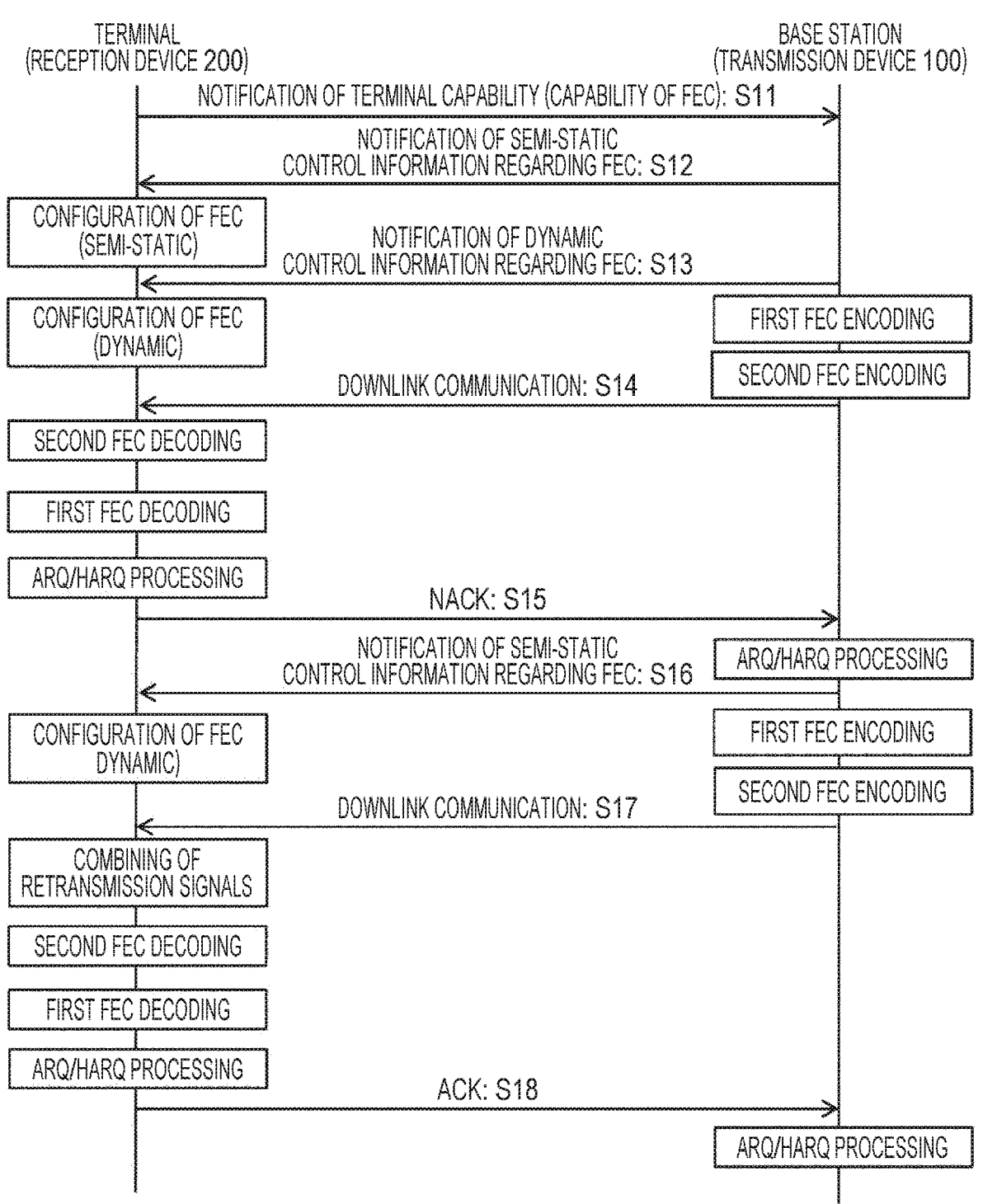
FIG. 6 is a diagram illustrating an example of a basic procedure of a communication sequence according to the present embodiment.

FIG. 6 illustrates an example of a basic procedure of a communication sequence according to the present embodiment. The figure illustrates an example of downlink communication from a base station to a terminal. Here, the base station is the transmission device 100 and the terminal is the reception device 200, but it is not limited to this case. The terminal may be a transmission device, and the base station may be a reception device. Here, the case of the 3GPP standard will be assumed, but a similar procedure can be performed in the case of the IEEE 802.11 standard.

First, the terminal notifies the base station of the cell to which the terminal itself is connected of information (terminal capability information) regarding the capability of the terminal (S11). As an example, the terminal capability information includes information regarding the capability of the first FEC and the capability of the second FEC. Notification of the terminal capability information is provided during an initial connection (initial access) procedure or provided after the initial connection. As the physical channel for notification, at least one of a random access channel (physical random access channel (PRACH)), an uplink control channel (physical uplink control channel (PUCCH)), or an uplink shared channel (physical uplink shared channel (PUSCH)) can be used.

The base station notifies the terminal connected to the cell managed by the base station of semi-static control information including information regarding the first FEC and the second FEC (S12). The semi-static control information may be cell-specific control information. Notification of this control information is provided during the procedure of the initial connection or after the initial connection. Furthermore, the notification of the semi-static control information may be provided as part of an RRC procedure such as radio resource control (RRC) signaling, RRC configuration, RRC reconfiguration, or the like. Furthermore, the notification of the semi-static control information may be periodically provided from the base station to the terminal. At least one of a broadcast channel (physical broadcast channel (PBCH)), a downlink control channel (physical downlink control channel, enhanced physical downlink control channel (EPDCCH)), or a downlink shared channel (physical downlink shared channel) can be used as the physical channel for providing notification of the control information.

Thereafter, in a case where downlink communication specifically occurs from the base station to the terminal, the base station notifies the terminal of control information (dynamic control information) such as a radio resource used for the downlink communication or the like from the base station (S13). Examples of occurrence of downlink communication from the base station to the terminal include a case where the terminal requests data download (pull), a case where push data occurs to the terminal, or the like.

The dynamic control information may include terminal-specific (UE-specific) or terminal-group-specific (UE-group-specific) control information. Here, the terminal group is, for example, a group of one or more terminals that are transmission destination targets in a case where the downlink communication is multicast or broadcast.

Examples of the dynamic control information include a frequency resource, a time resource, and a spatial resource for allocating downlink communication to a target terminal (or a terminal group). The frequency resource is, for example, a resource block, a subcarrier, a subcarrier group, or the like. The time resource is, for example, a subframe, a slot, a mini-slot, a symbol, or the like. The spatial resource is, for example, an antenna, an antenna port, a spatial layer, a spatial stream, or the like.

Furthermore, as another example of the dynamic control information, there is information regarding a non-orthogonal resource (power-related resources, interleave patterns, scramble patterns, diffusion patterns, or the like) of non-orthogonal multiple access (NOMA, multiuser superposition transmission (MUST), interleave division multiple access (IDMA), code division multiple access (CDMA)).

Furthermore, other examples of the dynamic control information include information regarding a modulation order, information regarding a modulation scheme, information regarding an encoding method and a coding rate of the second FEC, information regarding an encoding method and a coding rate of the first FEC, a setting related to ARQ/HARQ (new data indicator (NDI), redundancy version (RV), and the like), and the like. The modulation order represents the bit depth that can be transmitted with modulation symbols using a modulation scheme. The combination of the coding rate and the modulation scheme of the second FEC corresponds to, for example, a modulation and coding set (MCS).

The terminal that has received the dynamic control information performs setting for preparation for appropriate reception of downlink communication according to the received control information.

The base station transmits data of downlink communication to the terminal to the terminal on the basis of the control information notification of which is provided to the terminal (S14). More specifically, the base station encodes the data of the downlink communication by the first FEC, encodes the data encoded by the first FEC by the second FEC, and modulates the data encoded by the second FEC. The modulated data is converted into an analog signal, amplified, and then transmitted as a radio signal via an antenna. As a result, the radio signal is transmitted to the terminal.

The terminal receives a radio signal from the base station, performs AD conversion and demodulation on the received radio signal, further decodes the received radio signal by the second FEC, and further decodes the received radio signal by the first FEC. The demodulation, the second FEC decoding, and the first FEC decoding are performed according to the setting specified by the control information from the base station. The terminal transmits an ACK or a NACK (hereinafter, ACK/NACK) from the terminal to the base station depending on whether decoding of the data (original data) is successful or failed. In a case where the decoding fails, NACK is transmitted (S15), and in a case where the decoding succeeds, ACK is transmitted (S18).

The setting of the ARQ or HARQ processing may be changed depending on whether the data decoding is successful or failed. For example, in a case where the decoding fails, the terminal retransmits the signal for HARQ. In the base station, in order to combine retransmission signals, it is desirable to store a decoding result of data that has failed to be decoded or data that is being decoded (likelihood information such as a soft decision value, a log likelihood ratio (LLR), and the like) in a memory. The retransmission in ARQ or HARQ may be retransmission of an encoded symbol of the first FEC in which an error is detected, or may be retransmission of an encoded symbol necessary for decoding a data portion of data for which decoding has failed. Alternatively, retransmission of a code block in which an error is detected and retransmission of all blocks of the second FEC are also not excluded. The retransmission may be performed by another method.

The base station performs, according to the ACK/NACK received from the terminal, processing to be performed next. For example, in a case where notification of NACK is received (S15), preparation for retransmission of ARQ or HARQ is performed. Examples of preparation for the retransmission include selection of a redundancy version (RV), selection of a modulation and coding set (MCS), selection of a radio resource, and the like. The base station notifies the target terminal (or terminal group) of the dynamic control information again (S16), and performs the downlink communication according to the setting of the control information (S17).

In a case where the base station receives the ACK from the terminal (S18), the base station judges that the data to be transmitted is correctly received, and the base station moves to a process of transmitting next new data. The base station notifies the target terminal (or terminal group) of the dynamic control information again, and performs downlink communication according to the setting of the control information.

Hereinafter, first, as a comparative example of the present embodiment, an example of processing of generating a data frame of the 3GPP standard using two-stage FEC encoding and processing of decoding the data frame will be described.

Figure 7:
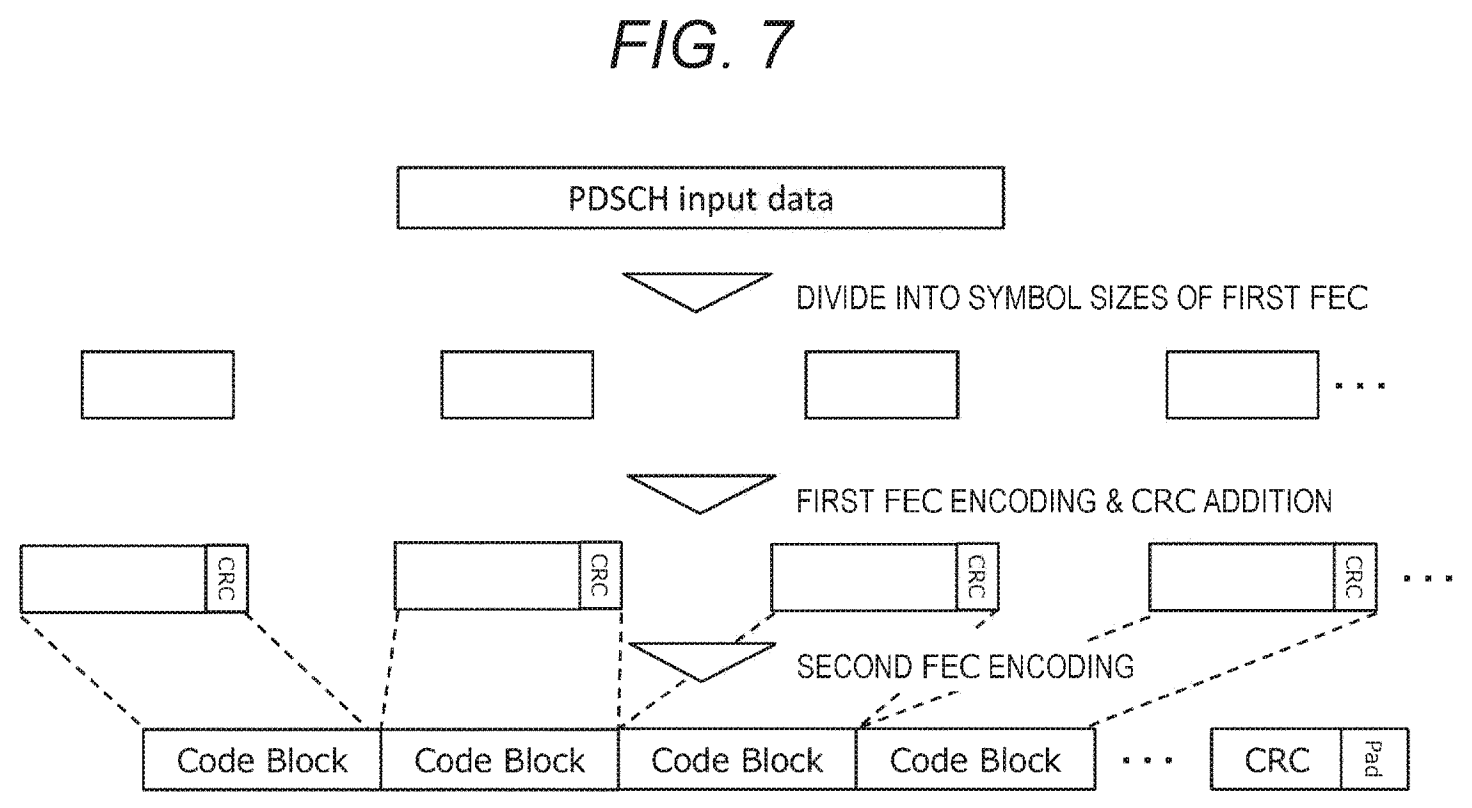

FIG. 7 illustrates an example of a procedure of generating a data frame of the 3GPP standard by using two-stage FEC encoding.

Figure 8:
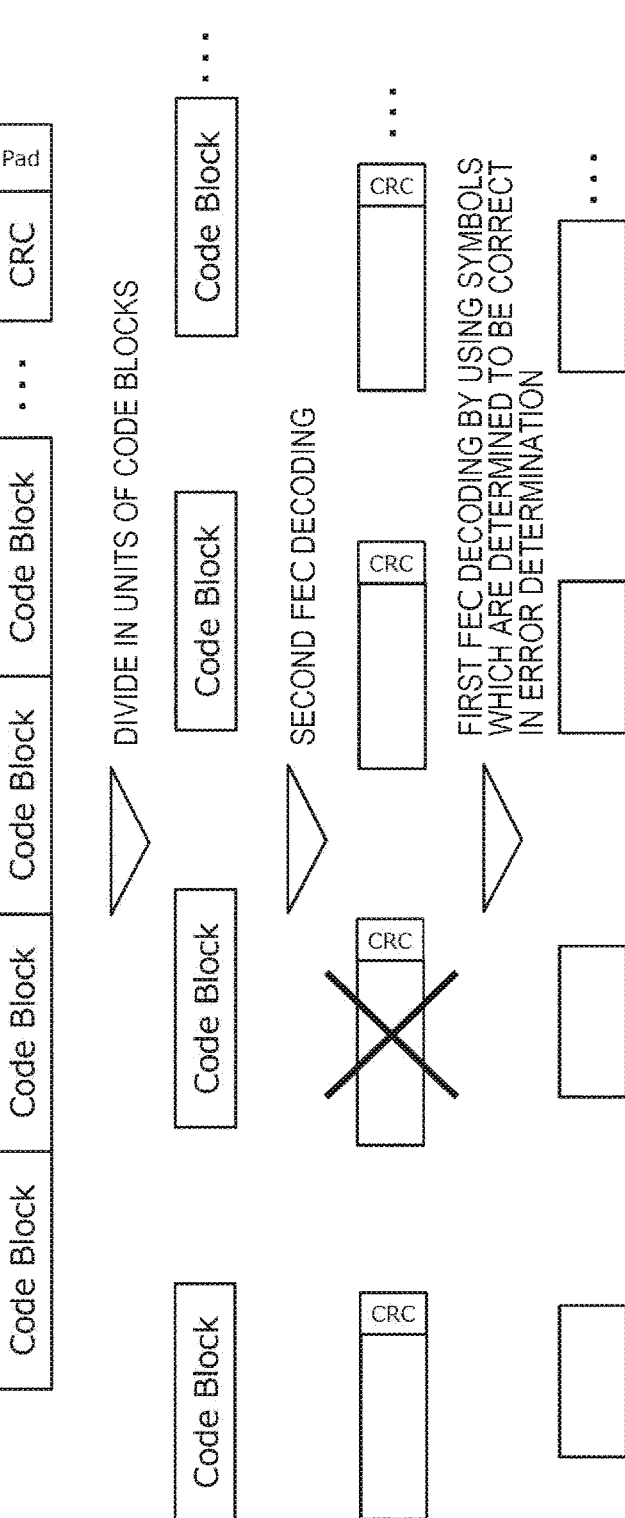
FIG. 8 is a diagram illustrating an example of a procedure of decoding a data frame generated by the procedure of FIG. 7.

FIG. 8 illustrates an example of a procedure of decoding the data frame generated by the procedure of FIG. 7.

In FIG. 7, the transmission device divides input data (physical downlink shared channel (PDSCH) input data) to be transmitted into symbol sizes of the first FEC. The encoding (erasure correction coding) of the first FEC is performed on the symbols of the first FEC obtained by the division. CRCs are added to the symbols (encoded symbols) obtained by the encoding of the first FEC as the error detection information.

The transmission device generates code blocks by performing encoding of the second FEC (encoding in the physical layer) on the encoded symbols to which the CRCs are added.

The transmission device generates a transport block by concatenating a plurality of code blocks. A CRC (CRC in units of transport blocks) is added to the transport block as error detection information.

The transmission device adds padding data to the end of the transport block to which the CRC is added so as to match the symbol unit of modulation as necessary. Therefore, a data frame that is a transmission frame is generated. The transmission device 100 transmits the data frame to the reception device.

In FIG. 8, the reception device that has received the data frame first performs CRC determination on the transport block. In a case where the result of the CRC determination is successful (OK), all the code blocks included in the transport block can be correctly received. Hence, the reception device performs decoding of the FEC (decoding of the second FEC and decoding of the first FEC), and transmits an acknowledgement response (ACK) to the transmission device.

In a case where a result of the CRC determination of the transport block is failure (NG), the reception device performs decoding of the second FEC on each code block included in the transport block, and obtains encoded symbols of the first FEC. Determination of the CRC added to each encoded symbol is performed. In the example of FIG. 8, the result of the CRC determination on the second encoded symbol from the left is NG.

The reception device regards the encoded symbol whose result of the CRC determination is NG as a lost symbol. The reception device performs decoding of the first FEC using the encoded symbols whose results of the CRC determination are OK.

In the comparative example described with reference to FIGS. 7 and 8, in the decoding of the first FEC, the encoded symbol whose result of the CRC determination is NG is regarded as a lost symbol and is not used for decoding. On the other hand, in the present embodiment, regardless of the results of the CRC determination of the encoded symbols, the decoding of the first FEC is performed using the bitwise likelihood information of the encoded symbols obtained by the decoding of the second FEC. Therefore, since the decoding of the first FEC can be performed using the information of the encoded symbols whose results of the CRC determination are NG, the decoding performance of the first FEC is improved, and the retransmission can be reduced. Hereinafter, a specific example of the present embodiment will be described.

Example 1

A diagram illustrating a procedure of generating a data frame in the 3GPP standard in Example 1 is the same as that in FIG. 7.

Figure 9:
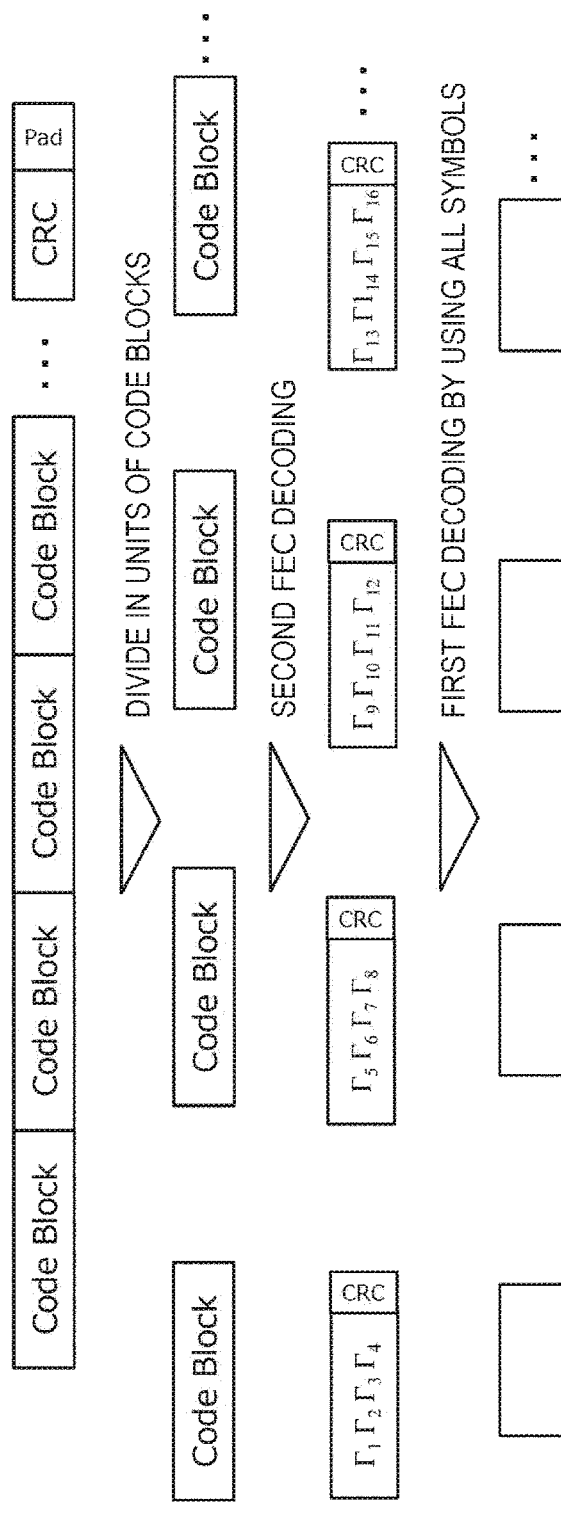
FIG. 9 is a diagram illustrating Example 1 of a procedure of decoding a data frame generated by the procedure of FIG. 7 according to the present embodiment.

FIG. 9 illustrates an example of a procedure of decoding the data frame generated by the procedure of FIG. 7 according to the present embodiment.

In FIG. 7, the transmission device 100 divides input data (physical downlink shared channel (PDSCH) input data) to be transmitted into symbol sizes of the first FEC. Note that data division is performed in the case of data having a certain length or more, and division is not performed in the case of data having a length less than the certain length. The transmission device 100 encodes the symbols obtained by the division according to the first FEC (erasure correction code). Error detection information is added to the symbols (encoded symbols) obtained by the encoding of the first FEC. Examples of the error detection information include CRC or syndrome. In the present embodiment, a case where CRCs are added will be described.

The transmission device 100 generates code blocks by performing encoding of the second FEC (encoding in the physical layer) on the encoded symbols to which the CRCs are added. Here, since the length of the encoded symbol to which the CRC is added matches the length to which the second FEC (encoding in the physical layer) is applied, the encoding of the second FEC is performed on the encoded symbol to which the CRC is added. In a case where the length of the encoded symbol to which the CRC is added does not match the length to which the second FEC is applied, division, concatenation, or both are performed on the encoded symbol. Therefore, data matching the length to which the second FEC is applied is generated, and the code blocks are generated by encoding the generated data with the second FEC.

The transmission device 100 generates a transport block by concatenating a plurality of code blocks. A CRC (CRC in units of transport blocks) is added to the transport block as error detection information. Other information such as syndrome or the like may be added as the error detection information.

The transmission device 100 adds padding data ("Pad" in the drawing) to the end of the transport block to which the CRC is added so as to match the symbol unit of modulation as necessary. Therefore, a data frame that is a transmission frame is generated. The transmission device 100 transmits the data frame to the reception device.

In FIG. 9, the reception device 200 that has received the data frame first performs CRC determination on the transport block. In a case where the result of the CRC determination is successful (OK), all the code blocks included in the transport block can be correctly received. Hence, the reception device performs decoding of the FEC (decoding of the second FEC and decoding of the first FEC), and transmits an acknowledgement response (ACK) to the transmission device 100. At this time, in the decoding of the first FEC, decoding using likelihood information described below may be performed, or the coded data of the first FEC decoded by the second FEC may be decoded.

In a case where the result of the CRC determination of the transport block is failure (NG), the reception device 200 divides a concatenation of code blocks included in the transport block into a plurality of code blocks (fragments). Decoding of the second FEC is performed on the divided code blocks to obtain the encoded symbols of the first FEC. Then, determination of the CRC added to each encoded symbol is performed. In the example of FIG. 9, it is assumed that the result of the CRC determination on the second encoded symbol from the left is NG.

The reception device 200 acquires bitwise likelihood information calculated in the decoding processing of the second FEC for each encoded symbol. In the ghost of FIG. 9, the bitwise likelihood information of the leftmost encoded symbol is $\Gamma_1$, $\Gamma_2$, $\Gamma_3$, and $\Gamma_4$. That is, the likelihood information of the first bit of the encoded symbol is $\Gamma_1$, the likelihood information of the second bit of the encoded symbol is $\Gamma_2$, the likelihood information of the third bit is $\Gamma_3$, and the likelihood information of the fourth bit is $\Gamma_4$. Similarly, bitwise likelihood information of the second encoded symbol from the left is $\Gamma_5$, $\Gamma_6$, $\Gamma_7$, and $\Gamma_8$. Bitwise likelihood information of the third encoded symbol from the left is $\Gamma_9$, $\Gamma_{10}$, $\Gamma_{11}$, and $\Gamma_{12}$. Bitwise likelihood information of the fourth encoded symbol from the left is $\Gamma_{13}$, $\Gamma_{14}$, $\Gamma_{15}$, and $\Gamma_{16}$.

Regardless of the result of the CRC determination, the reception device 200 performs decoding of the first FEC using the bitwise likelihood information of all the encoded symbols. As a decoding scheme using the likelihood information, the probability propagation method, the Peterson decoding method, the sum product method, the sweeping-out method, the MAP algorithm, or the like described above can be used. In a case where the decoding of the first FEC is successful, the reception device 200 provides data obtained by the decoding of the first FEC to the higher layer processing unit 201. Furthermore, the reception device 200 transmits an acknowledgement response (ACK) to the transmission device.

In a case where there is an error in the data obtained by the decoding of the first FEC, that is, in a case where all the errors cannot be corrected, the reception device 200 transmits a retransmission request to the transmission device 100 using an acknowledgement response (NACK).

As an example, the reception device 200 transmits a retransmission request for the encoded symbols whose results of the CRC determination are NG. Alternatively, a retransmission request is transmitted for encoded symbols corresponding to a data portion whose error has not been corrected. Encoded symbols for which retransmission is requested may be decided by another method, and a retransmission request of the decided encoded symbols may be transmitted. Note that the target for which retransmission is requested is not limited to encoded symbols, and may be code blocks or a transport block, or may be the entire original data. This description regarding the request for retransmission is similarly applied to the following description.

Example 2

Figure 10:
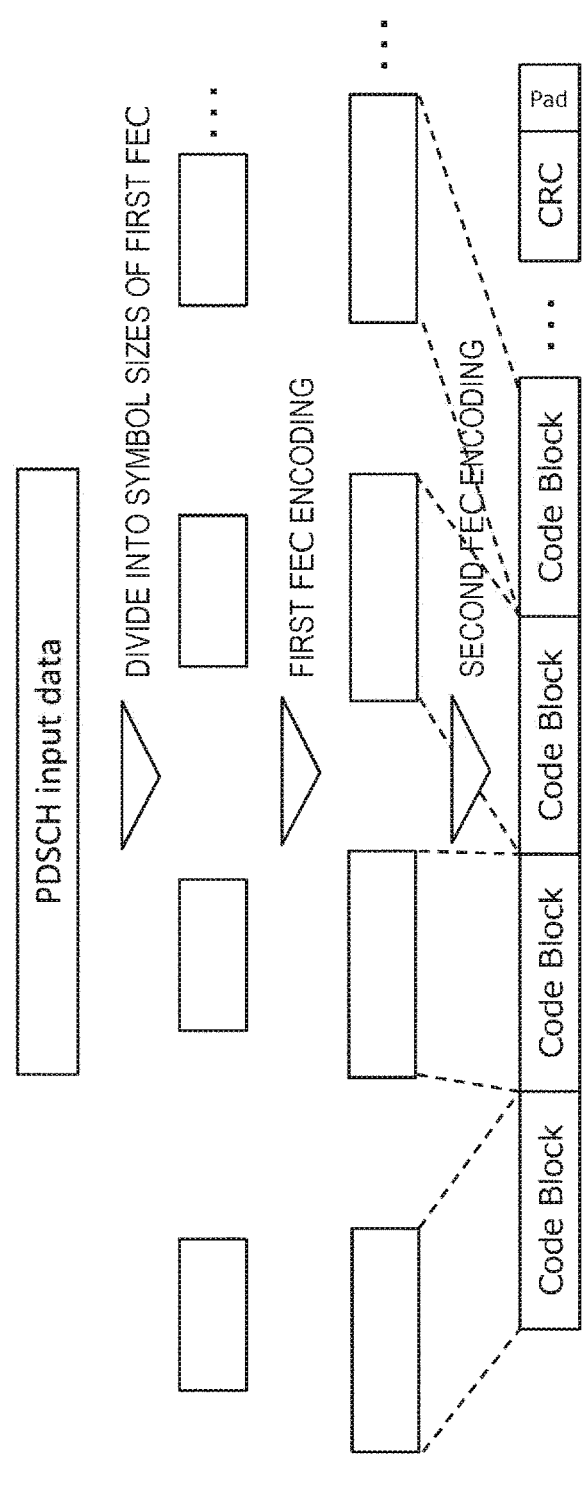
FIG. 10 is a diagram illustrating Example 2 of a procedure of generating a data frame in the 3GPP standard according to the present embodiment.

FIG. 10 illustrates Example 2 of a procedure of generating a data frame in the 3GPP standard according to the present embodiment.

Figure 11:
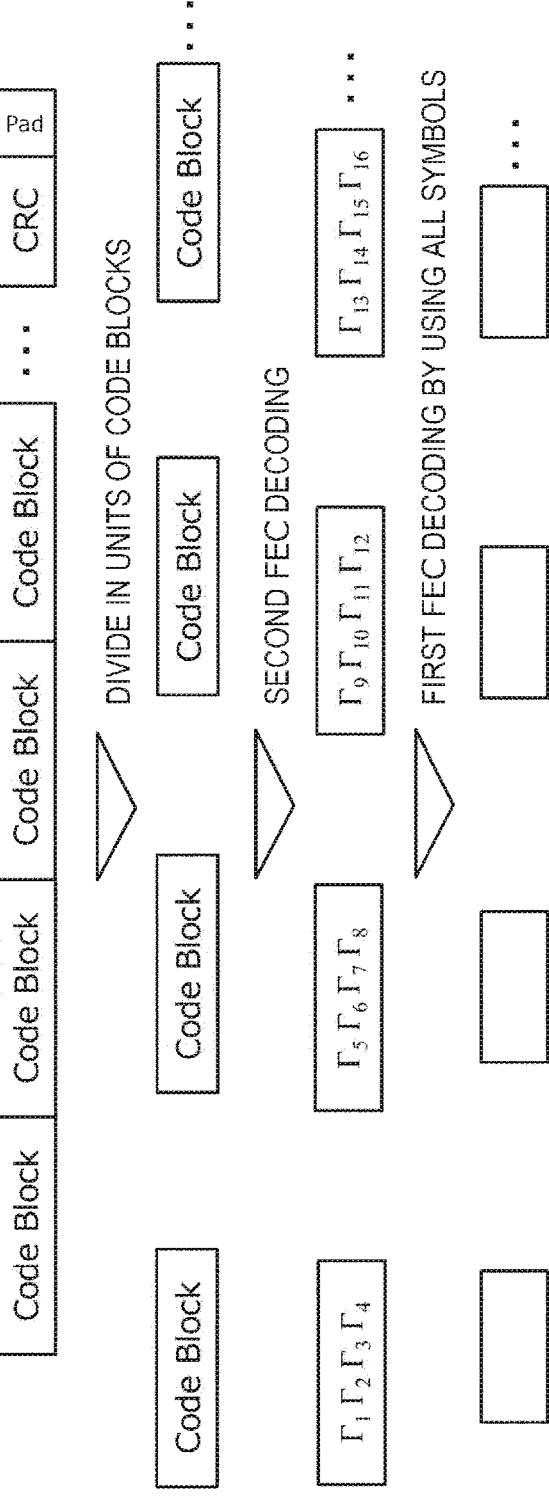
FIG. 11 is a diagram illustrating an example of a procedure of decoding a data frame generated by the procedure of FIG. 10 according to the present embodiment.

FIG. 11 illustrates an example of a procedure of decoding the data frame generated by the procedure of FIG. 10 according to the present embodiment.

In Example 2, a case where CRCs are not added to the encoded symbols and the length of the encoded symbol matches the length to which the second FEC is applied will be described. The description of similar processing to Example 1 will be omitted as appropriate.

In FIG. 10, the transmission device 100 divides input data (physical downlink shared channel (PDSCH) input data) to be transmitted into symbol sizes of the first FEC. Encoded symbols are obtained by performing encoding (erasure correction coding) of the first FEC on the symbols obtained by the division.

The transmission device 100 generates code blocks by performing encoding of the second FEC (encoding in the physical layer) on the encoded symbols.

The transmission device 100 generates a transport block by concatenating a plurality of code blocks. A CRC (CRC in units of transport blocks) is added to the transport block as error detection information. Other information such as syndrome or the like may be added as the error detection information.

The transmission device 100 adds padding data to the end of the transport block to which the CRC is added so as to match the symbol unit of modulation as necessary. Therefore, a data frame that is a transmission frame is generated. The transmission device 100 transmits the data frame to the reception device.

In FIG. 11, the reception device 200 that has received the data frame first performs CRC determination on the transport block. In a case where the result of the CRC determination is successful (OK), all the code blocks included in the transport block can be correctly received. Hence, the reception device performs decoding of the FEC (decoding of the second FEC and decoding of the first FEC), and transmits an acknowledgement response (ACK) to the transmission device.

In a case where a result of the CRC determination of the transport block is failure (NG), the reception device 200 performs decoding of the second FEC of each code block included in the transport block, and acquires encoded symbols of the first FEC. Furthermore, the reception device 200 acquires bitwise likelihood information obtained in the process of decoding of the second FEC for each encoded symbol of the first FEC.

The reception device 200 performs decoding of the first FEC using the bitwise likelihood information of all the encoded symbols. In a case where the decoding of the first FEC is successful, the reception device 200 provides data obtained by the decoding of the first FEC to the higher layer processing unit 201. Furthermore, the reception device 200 transmits an acknowledgement response (ACK) to the transmission device. In a case where there is an error in the data obtained by the decoding of the first FEC, that is, in a case where all the errors cannot be corrected, the reception device 200 requests the transmission device 100 to perform retransmission by using an acknowledgement response (NACK).

Example 3

Figure 12:
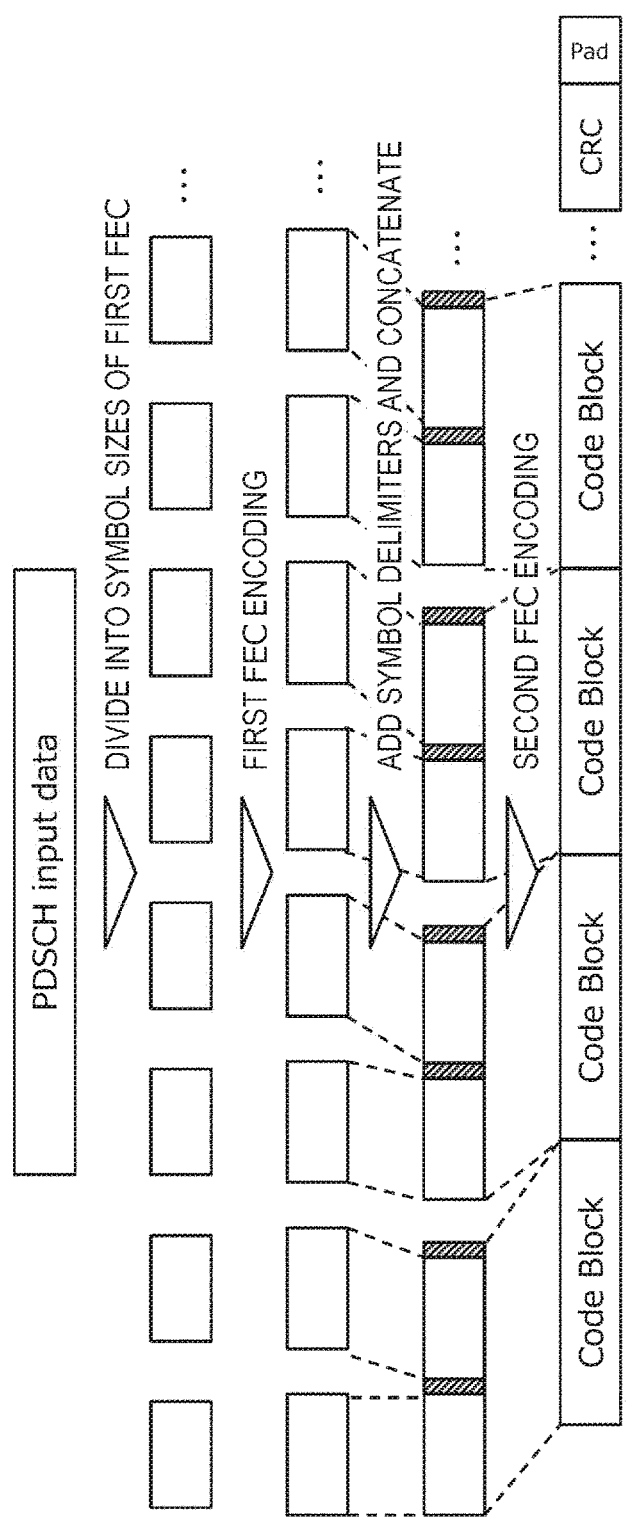
FIG. 12 is a diagram illustrating Example 3 of a procedure of generating a data frame in the 3GPP standard according to the present embodiment.

FIG. 12 illustrates Example 3 of a procedure of generating a data frame in the 3GPP standard according to the present embodiment.

Figure 13:
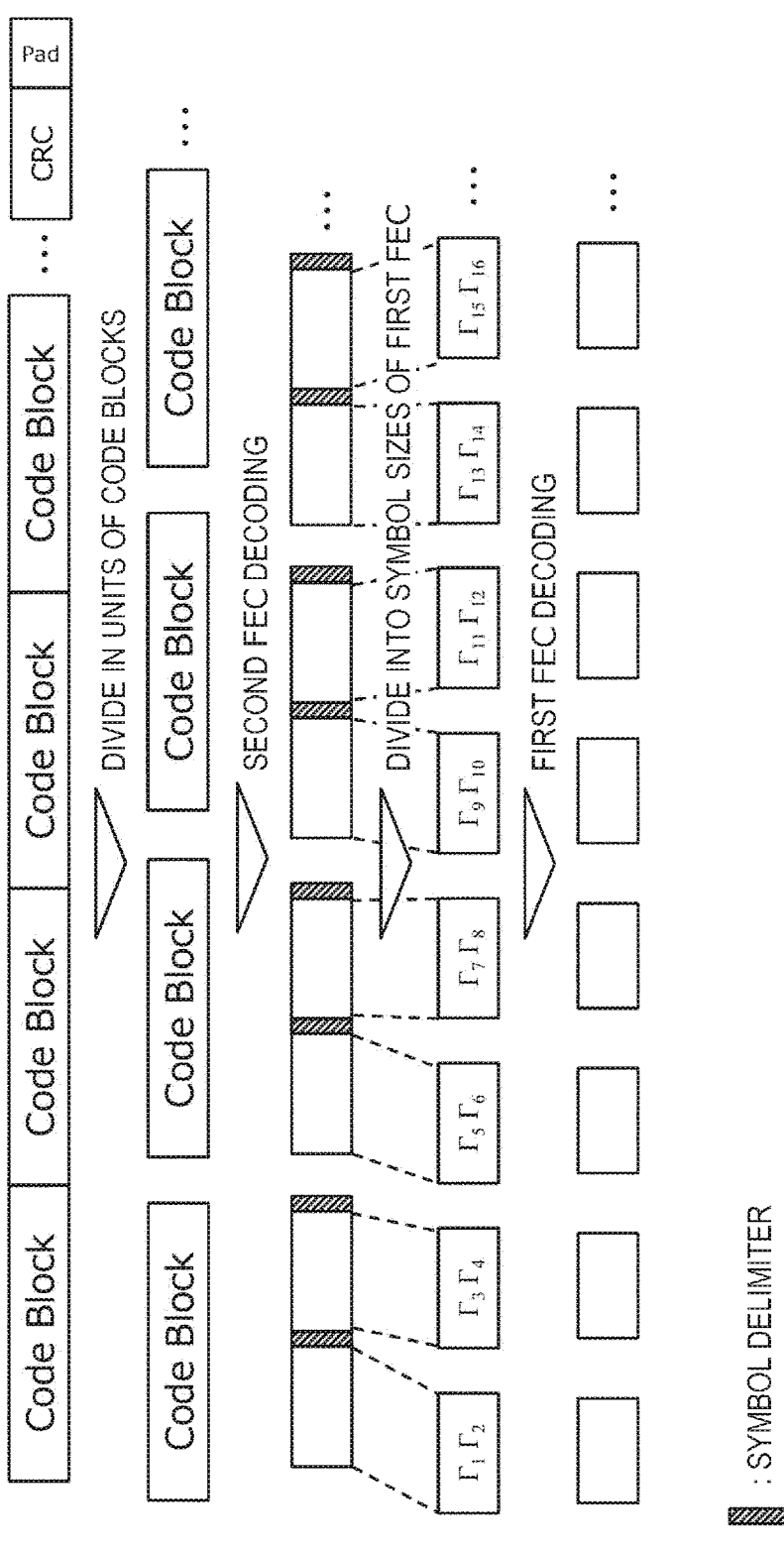
FIG. 13 is a diagram illustrating an example of a procedure of decoding a data frame generated by the procedure of FIG. 12 according to the present embodiment.

FIG. 13 illustrates an example of a procedure of decoding the data frame generated by the procedure of FIG. 12 according to the present embodiment.

In Example 3, a case where CRCs are not added to the encoded symbols and the length of the encoded symbol is shorter than the length to which the second FEC is applied will be described. However, it is also possible to modify the procedure of FIG. 12 so as to add CRCs.

In FIG. 12, the transmission device 100 divides input data (physical downlink shared channel (PDSCH) input data) to be transmitted into symbol sizes of the first FEC. Encoded symbols are obtained by performing encoding (erasure correction coding) of the first FEC on the symbols obtained by the division.

The transmission device 100 adds a delimiter including information regarding a boundary between encoded symbols to the end of each encoded symbol. This delimiter is particularly referred to as a symbol delimiter. In addition to the information indicating the boundary of the encoded symbols, the symbol delimiter may include, for example, information indicating the order number of an adjacent encoded symbol (immediately preceding encoded symbol or subsequent encoded symbol), the address of the transmission destination (destination) of the data frame, or the like. The transmission device 100 generates data matching the length to which the second FEC is applied by concatenating two encoded symbols to which symbol delimiters are added. The transmission device 100 generates a code block by performing encoding (encoding in the physical layer) of the second FEC on the generated data (including two encoded symbols and two symbol delimiters). In the example of FIG. 12, the symbol delimiter is added to the end of each encoded symbol, but the symbol delimiter may be added to the head of each encoded symbol.

The transmission device 100 generates a transport block by concatenating a plurality of code blocks. A CRC (CRC in units of transport blocks) is added to the transport block as error detection information. Other information such as syndrome or the like may be added as the error detection information.

The transmission device 100 adds padding data to the end of the transport block to which the CRC is added so as to match the symbol unit of modulation as necessary. Therefore, a data frame that is a transmission frame is generated. The transmission device 100 transmits the data frame to the reception device 200.

In FIG. 13, the reception device 200 that has received the data frame first performs CRC determination on the transport block. In a case where the result of the CRC determination is successful (OK), all the code blocks included in the transport block can be correctly received. Hence, the reception device 200 performs decoding of the FEC (decoding of the second FEC and decoding of the first FEC), and transmits an acknowledgement response (ACK) to the transmission device.

In a case where a result of the CRC determination of the transport block is failure (NG), the reception device 200 divides a concatenation of code blocks included in the transport block into a plurality of code blocks, and performs decoding of the second FEC on each code block. The reception device 200 separates decoded data of each code block into a plurality of fragments on the basis of symbol delimiters, and acquires each fragment as an encoded symbol of the first FEC. Bitwise likelihood information is acquired for each encoded symbol of the first FEC. In the example of FIG. 13, the decoded data of the second FEC of the leftmost code block is separated into two encoded symbols on the basis of the symbol delimiters. Then, bitwise likelihood information ($\Gamma_1\Gamma_2$) for the first encoded symbol and bitwise likelihood information ($\Gamma_3\Gamma_4$) for the second encoded symbol are obtained. Similarly, likelihood information is acquired for the third and subsequent encoded symbols. In a case where the destination address of the data frame is included in the symbol delimiters, it is checked whether the destination address matches the address of the own device. In a case where the destination address does not match the address of the own device, the data frame is discarded, and the subsequent processing may be omitted.

The reception device 200 performs decoding of the first FEC using the bitwise likelihood information of all the encoded symbols. In a case where the decoding of the first FEC is successful, the reception device 200 provides data obtained by the decoding of the first FEC to the higher layer processing unit 201. Furthermore, the reception device 200 transmits an acknowledgement response (ACK) to the transmission device 100. In a case where there is an error in the data obtained by the decoding of the first FEC, that is, in a case where all the errors cannot be corrected, the reception device 200 requests the transmission device 100 to perform retransmission by using an acknowledgement response (NACK).

Example 4

Figure 14:
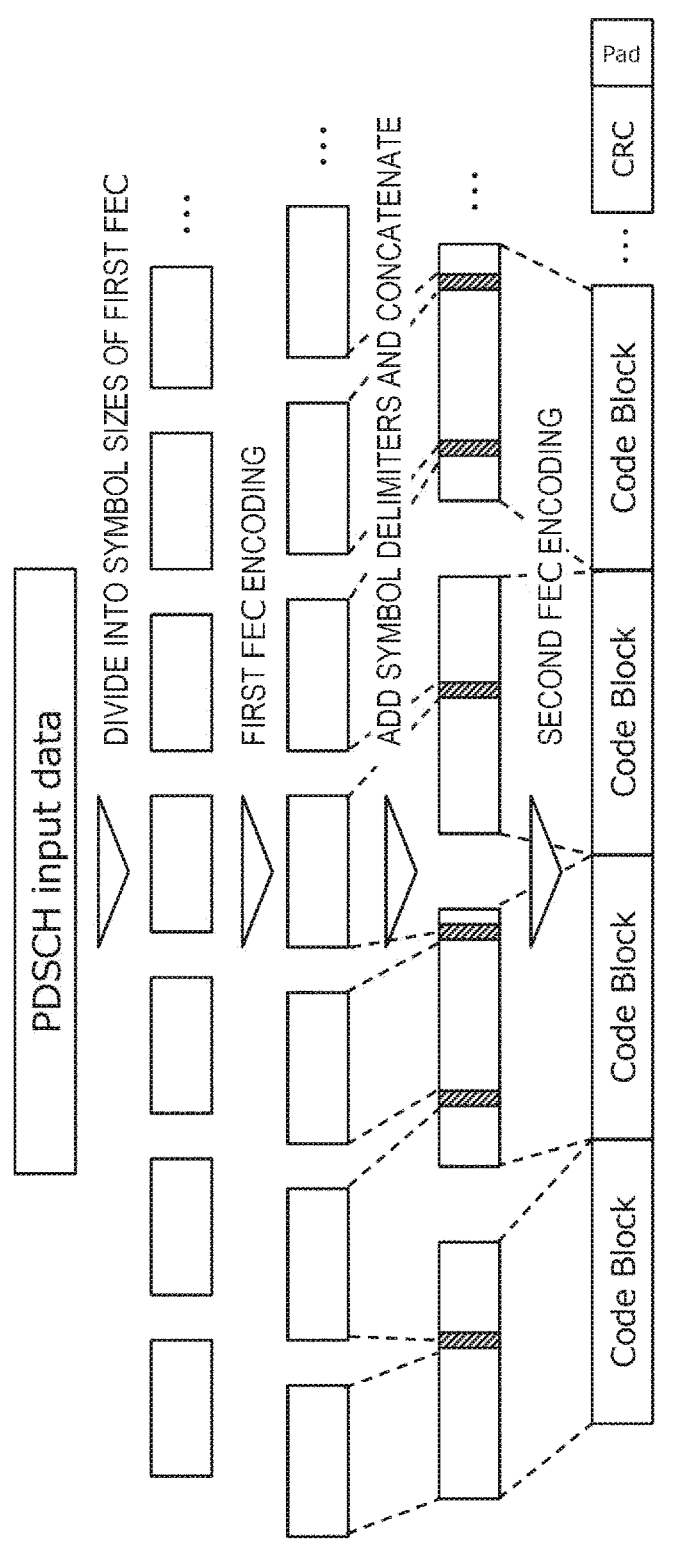
FIG. 14 is a diagram illustrating Example 4 of a procedure of generating a data frame in the 3GPP standard according to the present embodiment.

FIG. 14 illustrates Example 4 of a procedure of generating a data frame in the 3GPP standard according to the present embodiment.

Figure 15:
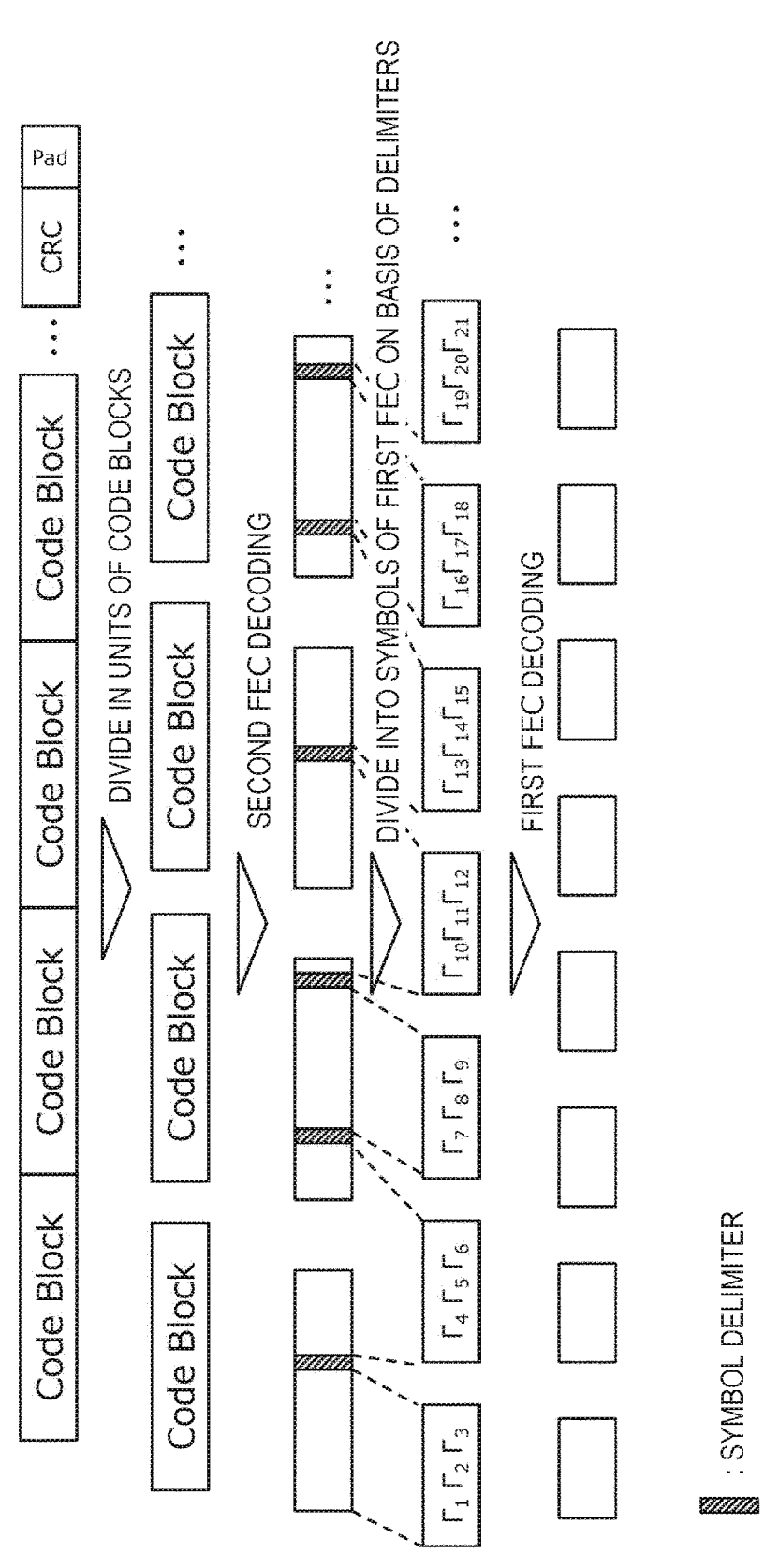
FIG. 15 is a diagram illustrating an example of a procedure of decoding a data frame generated by the procedure of FIG. 14 according to the present embodiment.

FIG. 15 illustrates an example of a procedure of decoding the data frame generated by the procedure of FIG. 14 according to the present embodiment.

In Example 4, an integer multiple (twice) of the length obtained by adding the symbol delimiter to the encoded symbol matches the length to which the second FEC is applied in Example 3, but in Example 4, a case where the length to which the second FEC is applied is not an integer multiple of the length obtained by adding the symbol delimiter to the encoded symbol will be described.

In FIG. 14, the transmission device 100 divides input data (physical downlink shared channel (PDSCH) input data) to be transmitted into symbol sizes of the first FEC. Encoded symbols are obtained by performing encoding (erasure correction coding) of the first FEC on the symbols obtained by the division.

The transmission device 100 adds symbol delimiters to the ends of a plurality of encoded symbols, and at least partially divides and concatenates the plurality of encoded symbols to which the symbol delimiters are added, thereby generating data that matches the length to which the second FEC is applied.

In the example of FIG. 14, the second encoded symbol from the left is divided into two fragments. The head side fragment is concatenated to the end of the first encoded symbol via a symbol delimiter. Therefore, data matching the length to which the second FEC is applied is generated.

Furthermore, the remaining fragment of the second encoded symbol is concatenated to the third encoded symbol via the symbol delimiter at the end of the second encoded symbol. Moreover, the head side fragment of the fourth encoded symbol from the left is concatenated to the end of the third encoded symbol via a symbol delimiter. Therefore, data matching the length to which the second FEC is applied is generated. Thereafter, similarly, data matching the length to which the second FEC is applied is generated.

The transmission device 100 generates code blocks by performing encoding of the second FEC (encoding in the physical layer) on each piece of data adjusted to the length to which the second FEC is applied.

The transmission device 100 generates a transport block by concatenating a plurality of code blocks. A CRC (CRC in units of transport blocks) is added to the transport block as error detection information. Other information such as syndrome or the like may be added as the error detection information.

The transmission device 100 adds padding data to the end of the transport block to which the CRC is added so as to match the symbol unit of modulation as necessary. Therefore, a data frame that is a transmission frame is generated. The transmission device 100 transmits the data frame to the reception device.

In FIG. 15, the reception device 200 that has received the data frame first performs CRC determination on the transport block. In a case where the result of the CRC determination is successful (OK), all the code blocks included in the transport block can be correctly received. Hence, the reception device 200 performs decoding of the FEC (decoding of the second FEC and decoding of the first FEC), and transmits an acknowledgement response (ACK) to the transmission device.

In a case where a result of the CRC determination of the transport block is failure (NG), the reception device 200 divides a concatenation of code blocks included in the transport block into a plurality of code blocks, and performs decoding of the second FEC on each code block. The reception device 200 divides decoded data of each code block into a plurality of fragments on the basis of the symbol delimiters. Encoded symbols are acquired by at least partially concatenating a plurality of fragments in accordance with the unit of the encoded symbol (fragments matching the length of the encoded symbol are acquired as is as encoded symbols). The bitwise likelihood information is obtained for each acquired encoded symbol.

In the example of FIG. 15, the decoded data of the second FEC of the leftmost code block is divided into two fragments on the basis of the symbol delimiter. The head side fragment matches the length of the encoded symbol, and the likelihood information ($\Gamma_1\Gamma_2\Gamma_3$) of the fragment is the likelihood information of the first encoded symbol as is. The likelihood information ($\Gamma_4\Gamma_5$) corresponding to the end side fragment is concatenated with the likelihood information ($\Gamma_6$) of the head side fragment of the coded data of the second FEC of the subsequent second code block, and the likelihood information of the second encoded symbol is obtained. Similarly, likelihood information of the third and subsequent encoded symbols is acquired.

The reception device 200 performs decoding of the first FEC using the bitwise likelihood information of all the encoded symbols. In a case where the decoding of the first FEC is successful, the reception device 200 provides data obtained by the decoding of the first FEC to the higher layer processing unit 201. Furthermore, the reception device 200 transmits an acknowledgement response (ACK) to the transmission device. In a case where there is an error in the data obtained by the decoding of the first FEC, that is, in a case where all the errors cannot be corrected, the reception device 200 requests the transmission device 100 to perform retransmission by using an acknowledgement response (NACK).

Example 5

Figure 16:
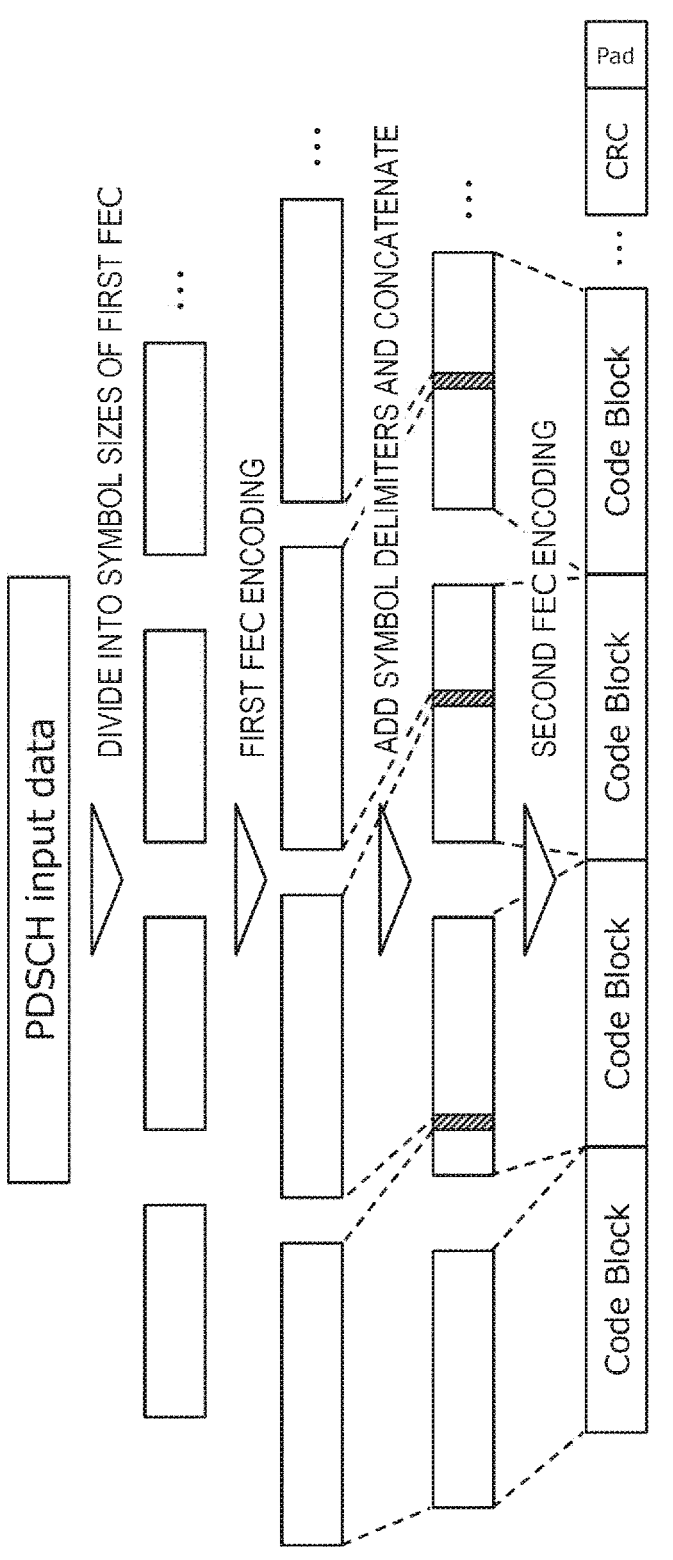
FIG. 16 is a diagram illustrating Example 5 of a procedure of generating a data frame in the 3GPP standard according to the present embodiment.

FIG. 16 illustrates Example 5 of a procedure of generating a data frame in the 3GPP standard according to the present embodiment.

Figure 17:
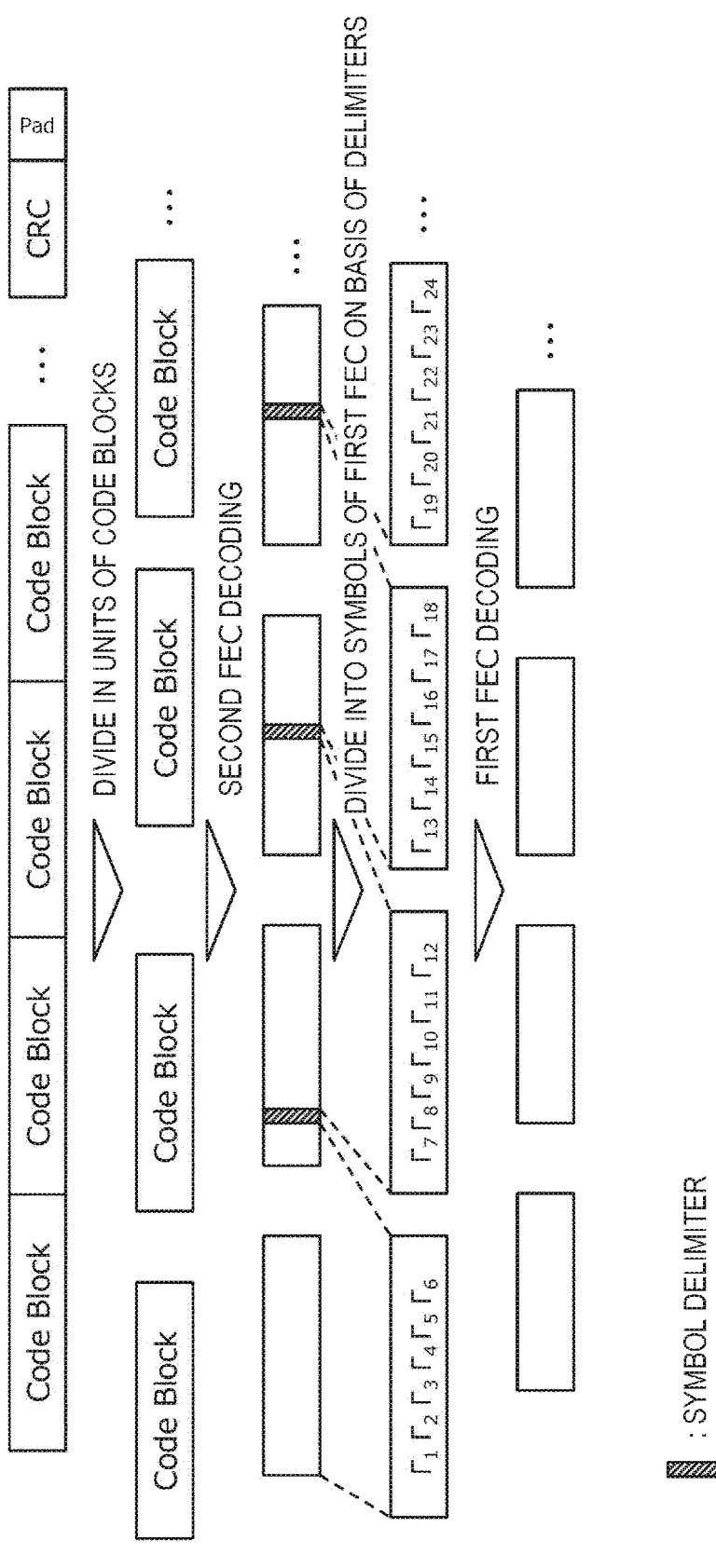
FIG. 17 is a diagram illustrating an example of a procedure of decoding a data frame generated by the procedure of FIG. 16 according to the present embodiment.

FIG. 17 illustrates an example of a procedure of decoding the data frame generated by the procedure of FIG. 16 according to the present embodiment.

In Example 3 and Example 4 described above, the length of the encoded symbol is shorter than the length to which the second FEC is applied, but in Example 5, a case where the length of the encoded symbol is longer than the length to which the second FEC is applied will be described. Although CRCs are not added to the encoded symbols, it is also possible to modify the procedure of FIG. 16 so as to add CRCs.

In FIG. 16, the transmission device 100 divides input data (physical downlink shared channel (PDSCH) input data) to be transmitted into symbol sizes of the first FEC. Encoded symbols are obtained by performing encoding (erasure correction coding) of the first FEC on the symbols obtained by the division.

The transmission device 100 adds a symbol delimiter to the end of each of the plurality of encoded symbols. The plurality of encoded symbols to which the symbol delimiters are added is divided into a plurality of fragments, and the fragments are concatenated between adjacent encoded symbols to generate data that matches the length to which the second FEC is applied.

In the example of FIG. 16, the leftmost encoded symbol to which the symbol delimiter is added is divided into two fragments, and the head side fragment matches the length to which the second FEC is applied as is. The end side fragment is concatenated to the head side fragment of the second encoded symbol from the left via the symbol delimiter of the leftmost encoded symbol, and data matching the length to which the second FEC is applied is generated. The end side fragment of the second encoded symbol from the left is concatenated to the head side fragment of the third encoded symbol from the left via the symbol delimiter of the second encoded symbol, and data matching the length to which the second FEC is applied is generated. Thereafter, similarly, data matching the length to which the second FEC is applied is generated.

The transmission device 100 generates code blocks by performing encoding of the second FEC (encoding in the physical layer) on each piece of data adjusted to the length to which the second FEC is applied.

The transmission device 100 generates a transport block by concatenating a plurality of code blocks. A CRC (CRC in units of transport blocks) is added to the transport block as error detection information. Other information such as syndrome or the like may be added as the error detection information.

The transmission device 100 adds padding data to the end of the transport block to which the CRC is added so as to match the symbol unit of modulation as necessary. Therefore, a data frame that is a transmission frame is generated. The transmission device 100 transmits the data frame to the reception device 200.

In FIG. 17, the reception device 200 that has received the data frame first performs CRC determination on the transport block. In a case where the result of the CRC determination is successful (OK), all the code blocks included in the transport block can be correctly received. Hence, the reception device 200 performs decoding of the FEC (decoding of the second FEC and decoding of the first FEC), and transmits an acknowledgement response (ACK) to the transmission device 100.

In a case where a result of the CRC determination of the transport block is failure (NG), the reception device 200 divides a concatenation of code blocks included in the transport block into a plurality of code blocks, and performs decoding of the second FEC on each code block. The reception device 200 divides decoded data of each code block into a plurality of fragments on the basis of the symbol delimiters. Encoded symbols are acquired by concatenating a plurality of fragments between adjacent encoded symbols in accordance with the units of the encoded symbols. Furthermore, bitwise likelihood information is obtained for each acquired encoded symbol.

In the example of FIG. 17, the likelihood information $(\Gamma_1\Gamma_2\Gamma_3\Gamma_4\Gamma_5)$ of the decoded data of the second FEC of the leftmost code block and the likelihood information $(\Gamma_6)$ of the head side fragment of the second decoded data are concatenated to obtain the likelihood information of the first encoded symbol. Furthermore, the likelihood information $(\Gamma_7\Gamma_8\Gamma_9\Gamma_{10})$ of the end side fragment of the decoded data of the second FEC of the second code block from the left is concatenated to the likelihood information $(\Gamma_{11}\Gamma_{12})$ of the head side fragment of the decoded data of the second FEC of the third code block from the left. Therefore, likelihood information of the second encoded symbol is obtained. Similarly, likelihood information of the third and subsequent encoded symbols is obtained.

The reception device 200 performs decoding of the first FEC using the bitwise likelihood information of all the encoded symbols. In a case where the decoding of the first FEC is successful, the reception device 200 provides data obtained by the decoding of the first FEC to the higher layer processing unit 201. Furthermore, the reception device 200 transmits an acknowledgement response (ACK) to the transmission device. In a case where there is an error in the data obtained by the decoding of the first FEC, that is, in a case where all the errors cannot be corrected, the reception device 200 requests the transmission device 100 to perform retransmission by using an acknowledgement response (NACK).

Example 6

Figure 18:
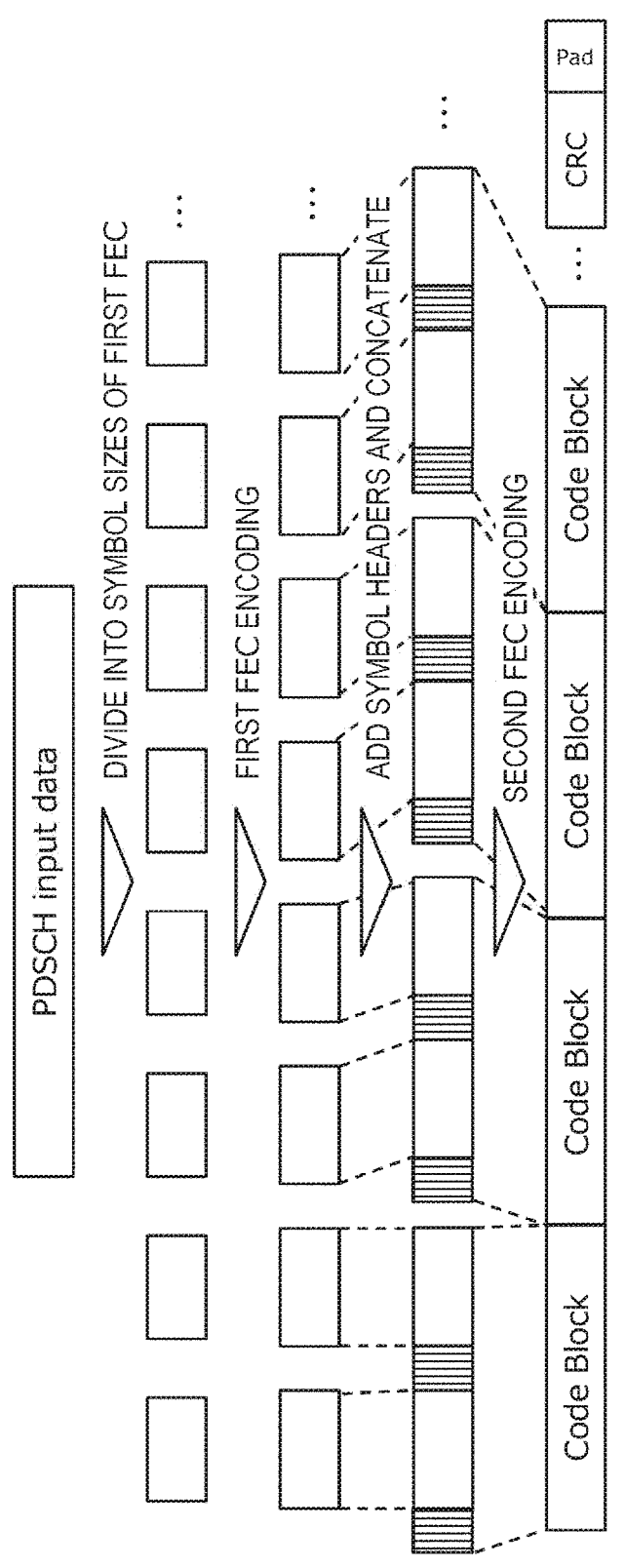
FIG. 18 is a diagram illustrating Example 6 of a procedure of generating a data frame in the 3GPP standard according to the present embodiment.

FIG. 18 illustrates Example 6 of a procedure of generating a data frame in the 3GPP standard according to the present embodiment.

Figure 19:
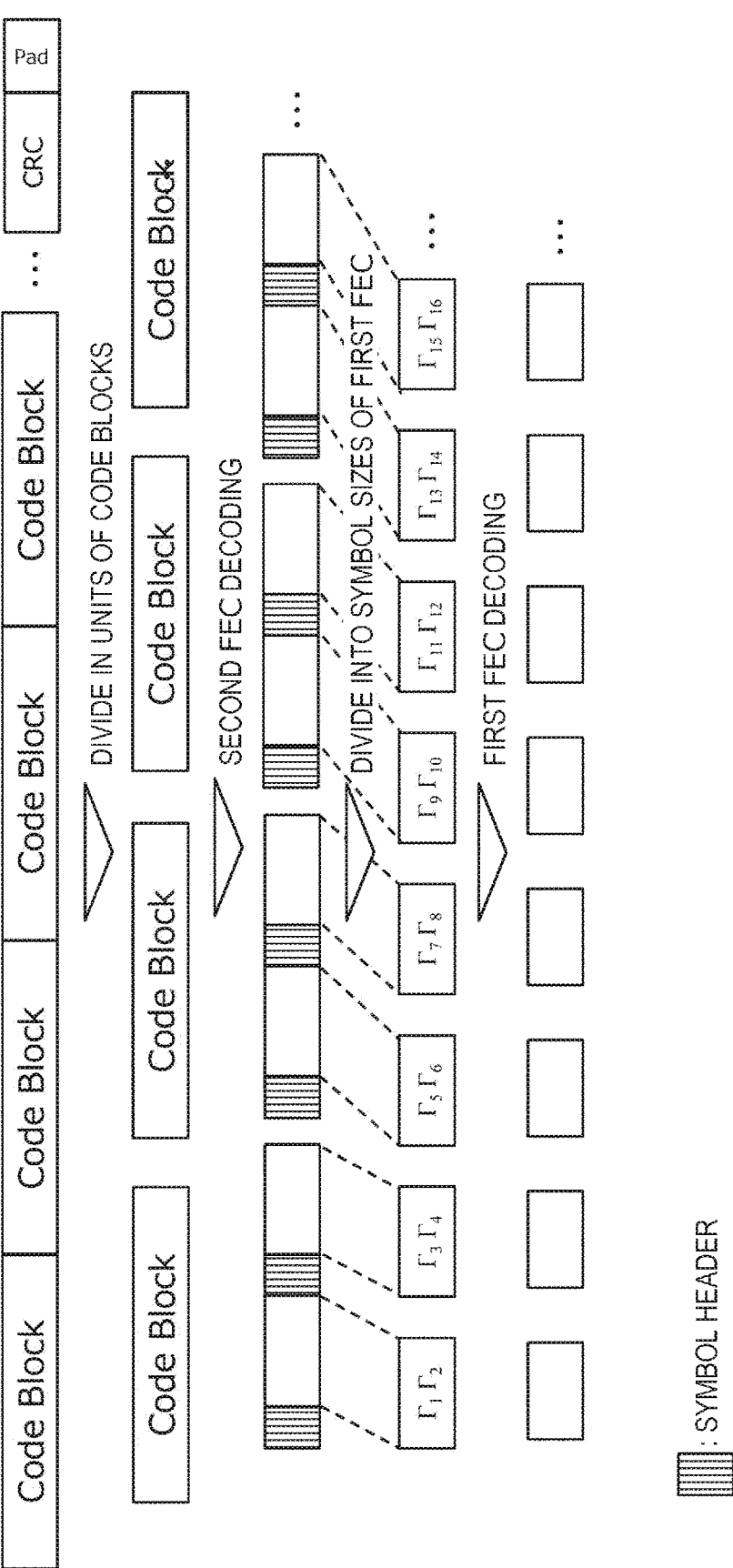
FIG. 19 is a diagram illustrating an example of a procedure of decoding a data frame generated by the procedure of FIG. 18 according to the present embodiment.

FIG. 19 illustrates an example of a procedure of decoding the data frame generated by the procedure of FIG. 18 according to the present embodiment.

In Example 6, symbol headers are added to the heads of the encoded symbols. A case where the length of the encoded symbol is shorter than the length to which the second FEC is applied will be described. Although an example in which CRCs are not added to the encoded symbols is illustrated, it is also possible to modify the procedure of FIG. 18 so as to add CRCs.

In FIG. 18, the transmission device 100 divides input data (physical downlink shared channel (PDSCH) input data) to be transmitted into symbol sizes of the first FEC. Encoded symbols are obtained by performing encoding (erasure correction coding) of the first FEC on the symbols obtained by the division.

The transmission device 100 adds a symbol header to the head of each encoded symbol. The symbol header includes information regarding encoding of the first code and a symbol delimiter. The symbol header is an example of a header including information regarding encoding of the first code.

Figure 20:
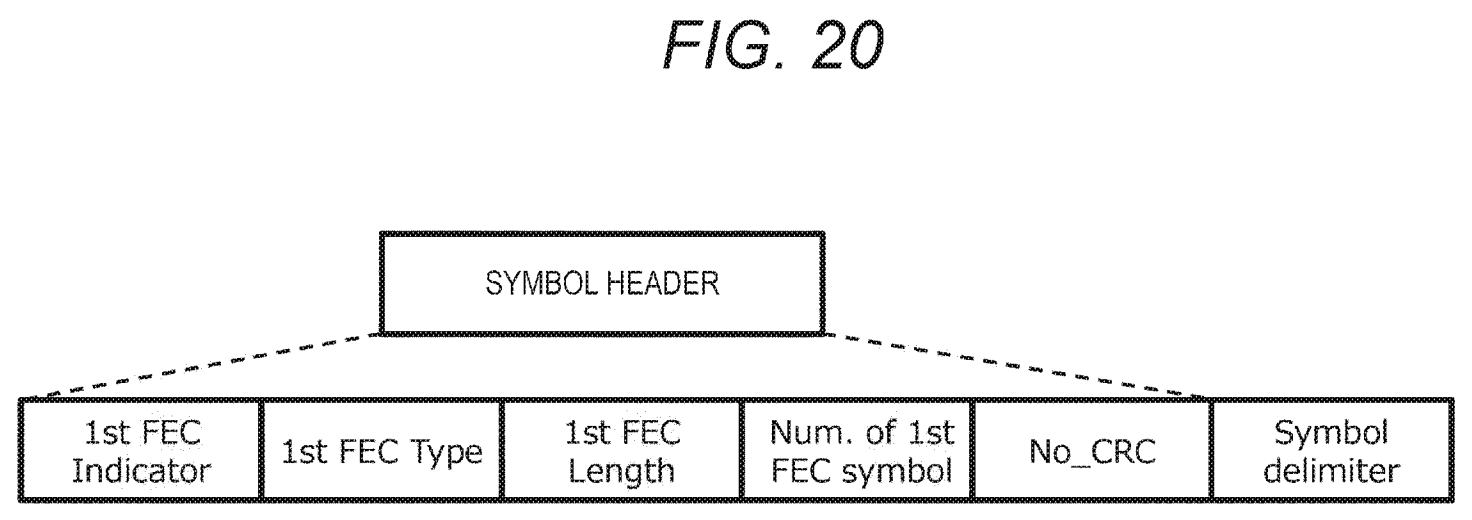

FIG. 20 illustrates a format example of the symbol header. The symbol header includes a first FEC indicator (1st FEC indicator), a first FEC type (1st FEC Type), a first FEC length (1st FEC Length), a number of first FEC symbols (Num. of 1st FEC symbol), a first FEC index (1st FEC Index), No_CRC, and a symbol delimiter.

The first FEC indicator includes information for identifying whether or not encoding of the first FEC is performed (whether or not it is necessary to perform decoding of the first FEC on the reception side). The first FEC type includes information indicating a type (for example, a type of a code) of the first FEC. The first FEC length includes information indicating a symbol length of the first FEC. The first FEC symbol number includes the number of symbols to which the first FEC header is applied. In the example of FIG. 18, since a symbol header is added for each encoded symbol, the number of symbols is 1. The first FEC index is information (sequence number) indicating a position of a symbol in a symbol sequence. No_CRC is information for identifying whether or not CRC is added to the encoded symbol of the first FEC. Even in a case where the FCS is used as the error detection information, a similar field can be provided. As described above, the symbol delimiter includes information for identifying a boundary between encoded symbols. The symbol delimiter or the symbol header may further include other additional information, such as a destination address of the data frame or the like.

Some of the fields illustrated in FIG. 20 may not exist, or fields other than those illustrated in FIG. 20 may exist. For example, a time stamp field and a total number of symbols field may be included. The reception device 200 can perform decoding of the first FEC using the information included in the symbol header. The order of the fields illustrated in FIG. 20 is an example, and other orders may be used. For example, the symbol delimiter may be located at the head.

The transmission device 100 generates data matching the length to which the second FEC is applied by concatenating a plurality of (two in the example of FIG. 19) encoded symbols to which symbol headers are added. The transmission device 100 generates a code block by performing encoding (encoding in the physical layer) of the second FEC on each data (including two encoded symbols and two symbol headers).

The transmission device 100 generates a transport block by concatenating a plurality of code blocks. A CRC (CRC in units of transport blocks) is added to the transport block as error detection information. Other information such as syndrome or the like may be added as the error detection information.

The transmission device 100 adds padding data to the end of the transport block to which the CRC is added so as to match the symbol unit of modulation as necessary. Therefore, a data frame that is a transmission frame is generated. The transmission device 100 transmits the data frame to the reception device 200.

In FIG. 19, the reception device 200 that has received the data frame first performs CRC determination on the transport block. In a case where the result of the CRC determination is successful (OK), all the code blocks included in the transport block can be correctly received. Hence, the reception device 200 performs decoding of the FEC (decoding of the second FEC and decoding of the first FEC), and transmits an acknowledgement response (ACK) to the transmission device.

In a case where a result of the CRC determination of the transport block is failure (NG), the reception device 200 divides a concatenation of code blocks included in the transport block into a plurality of code blocks, and performs decoding of the second FEC on each code block. The reception device 200 specifies the encoded symbols to which each symbol header is applied in the decoded data of the second FEC, and acquires bitwise likelihood information of the encoded symbols. In the example of FIG. 19, bitwise likelihood information ($\Gamma_1\Gamma_2$) of the first encoded symbol and bitwise likelihood information ($\Gamma_3\Gamma_4$) of the second encoded symbol are acquired for the decoded data of the second FEC of the leftmost code block. Similarly, bitwise likelihood information is acquired for the third and subsequent encoded symbols. In a case where the destination address of at least any symbol header data frames is included, it is checked whether the destination address matches the address of the own device. In a case where the destination address does not match the own device, the data frame is discarded, and the subsequent processing may be omitted.

The reception device 200 performs decoding of the first FEC using the bitwise likelihood information of all the encoded symbols. In a case where the decoding of the first FEC is successful, the reception device 200 provides data obtained by the decoding of the first FEC to the higher layer processing unit 201. Furthermore, the reception device 200 transmits an acknowledgement response (ACK) to the transmission device. In a case where there is an error in the data obtained by decoding, that is, in a case where all the errors cannot be corrected, the reception device 200 requests the transmission device 100 to perform retransmission by using an acknowledgement response (NACK).

Example 7

Figure 21:
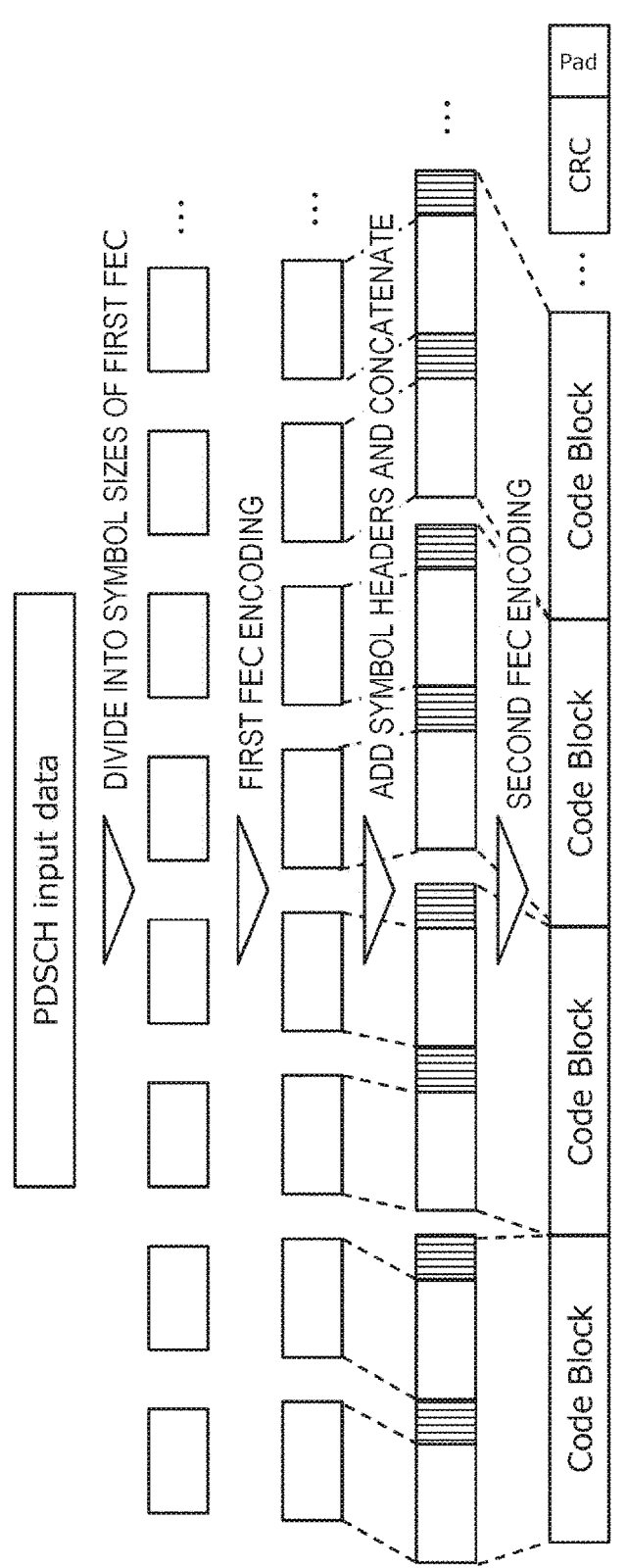
FIG. 21 is a diagram illustrating Example 7 of a procedure of generating a data frame in the 3GPP standard according to the present embodiment.

FIG. 21 illustrates Example 7 of a procedure of generating a data frame in the 3GPP standard according to the present embodiment.

Figure 22:
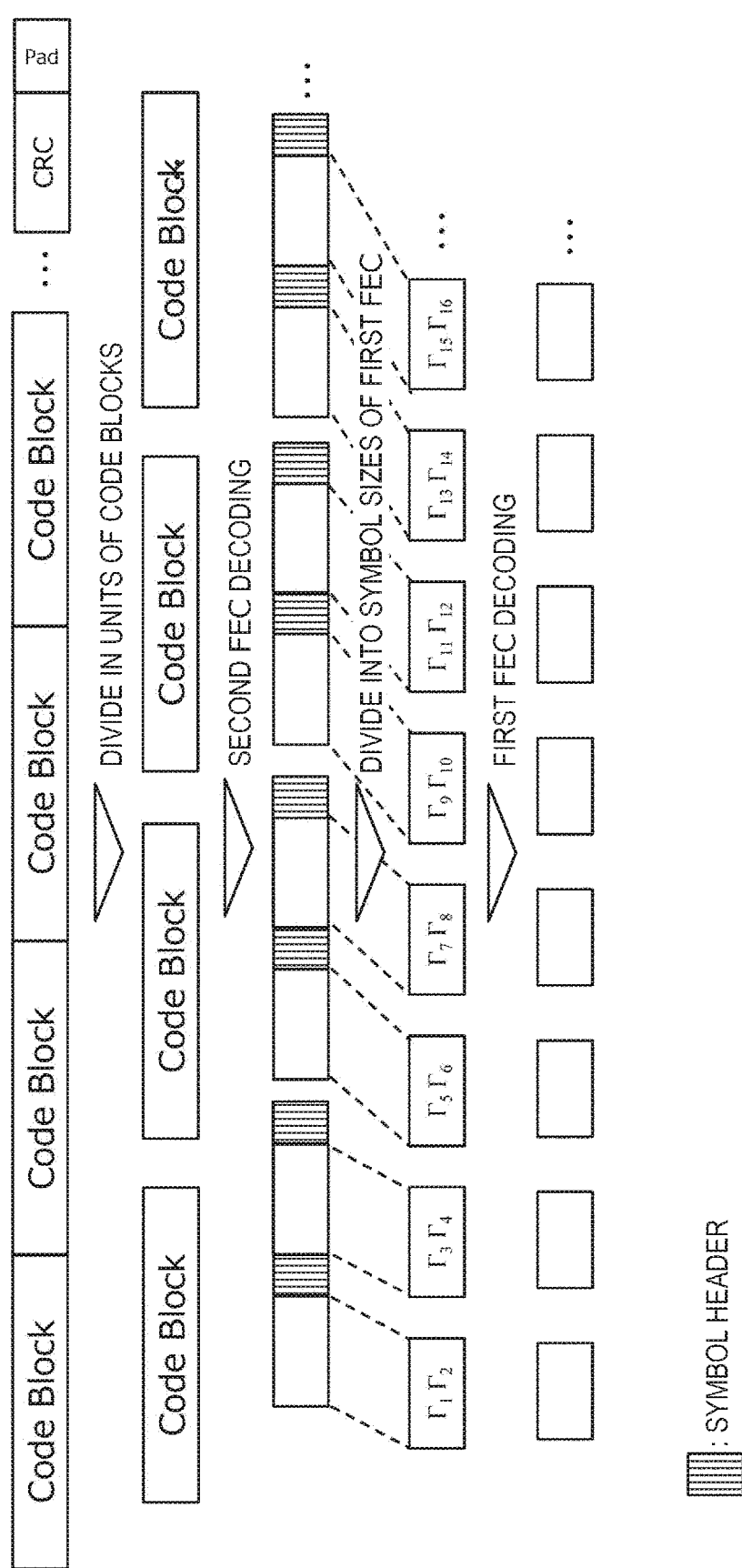
FIG. 22 is a diagram illustrating an example of a procedure of decoding a data frame generated by the procedure of FIG. 21 according to the present embodiment.

FIG. 22 illustrates an example of a procedure of decoding the data frame generated by the procedure of FIG. 21 according to the present embodiment.

In Example 6 of FIG. 18 described above, a symbol header is added to the head of each encoded symbol, but in Example 7, a symbol header is added to the end of each encoded symbol. Since the others are similar to Example 6, the description thereof is omitted.

Example 8

Figure 23:
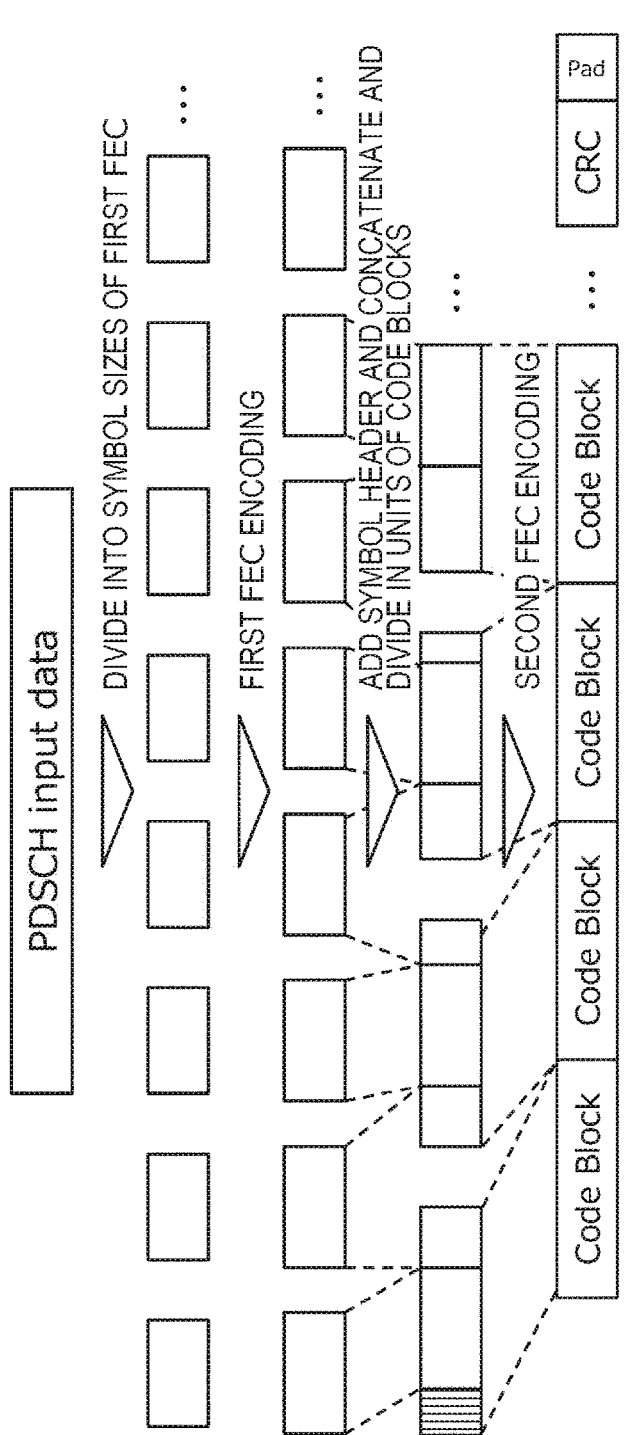
FIG. 23 is a diagram illustrating Example 8 of a procedure of generating a data frame in the 3GPP standard according to the present embodiment.

FIG. 23 illustrates Example 8 of a procedure of generating a data frame in the 3GPP standard according to the present embodiment.

In Example 6 of FIG. 18 described above, a symbol header is added to the head of each encoded symbol, but in Example 8, a symbol header is added only to the head encoded symbol. The symbol header also includes information regarding the second and subsequent encoded symbols.

Since the symbol header includes the total number of symbols and the symbol size, the reception device 200 can specify each encoded symbol using the symbol header. This example is similar to Example 6 except that the symbol header is added only to the first encoded symbol, and thus description thereof is omitted.

Example 9

Figure 24:
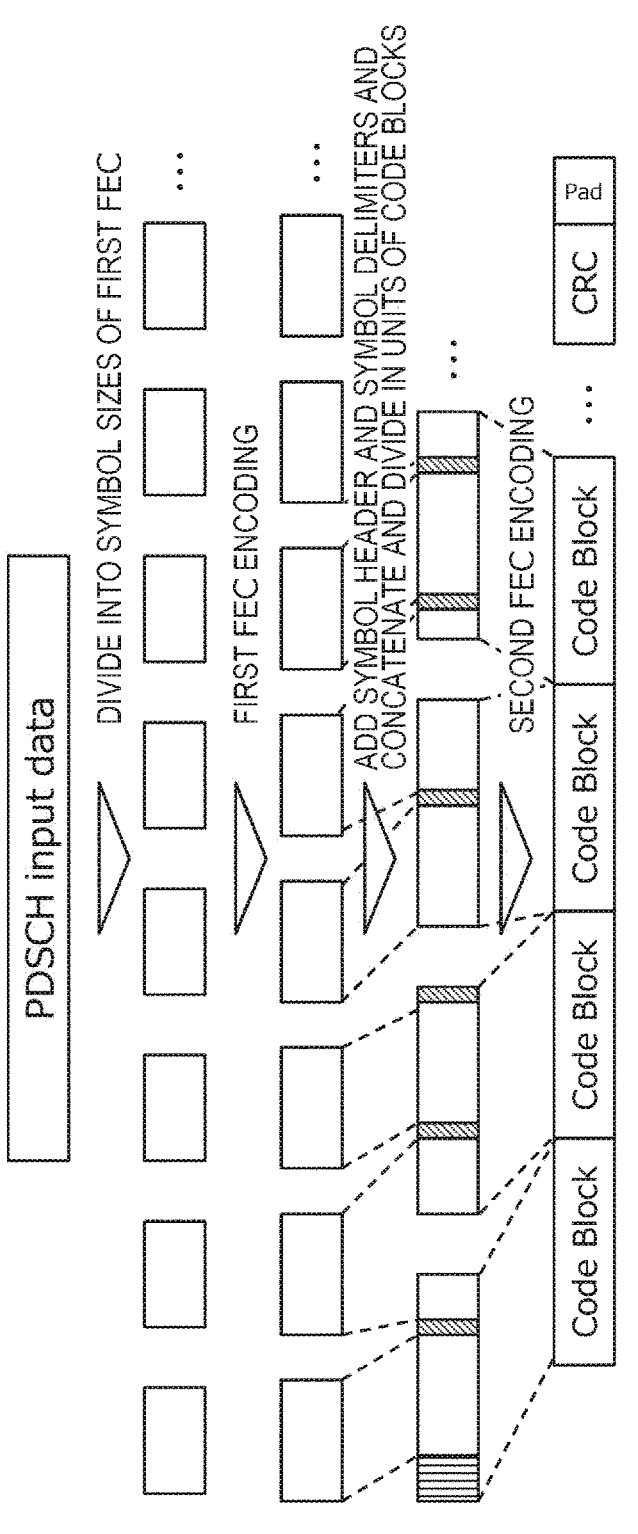
FIG. 24 is a diagram illustrating Example 9 of a procedure of generating a data frame in the 3GPP standard according to the present embodiment.
Figure 24:

FIG. 24 illustrates Example 9 of a procedure of generating a data frame in the 3GPP standard according to the present embodiment.

In Example 9, a symbol delimiter is added to the end of each encoded symbol, and a symbol header is added only to the first encoded symbol. Even in a case where information such as a symbol length or the like is not included in the symbol header, the reception device 200 can specify each encoded symbol using each symbol delimiter.

Example 10

Figure 25:
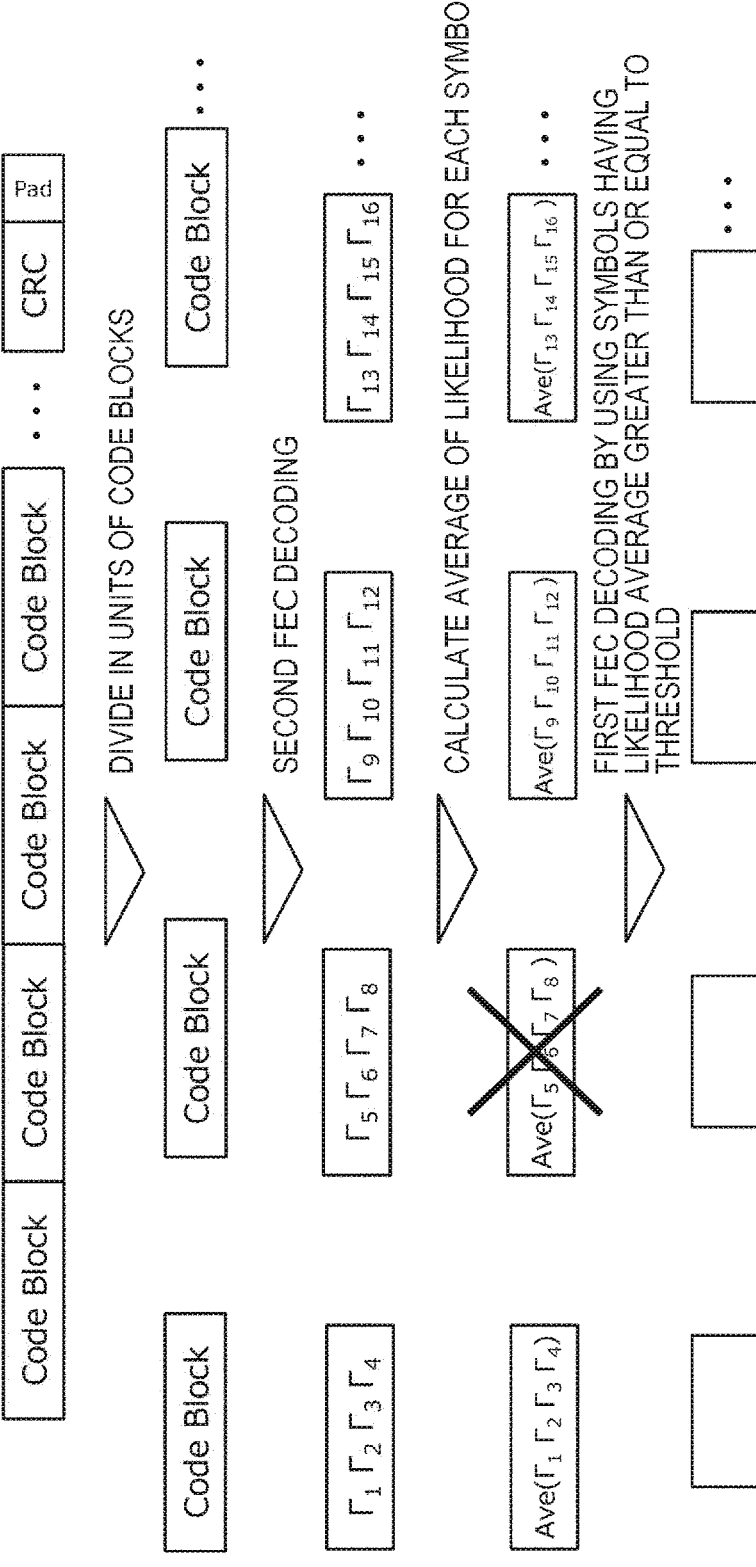
FIG. 25 is a diagram illustrating another example of the procedure of decoding the data frame according to the 3GPP standard generated by the procedure of FIG. 10.

FIG. 25 illustrates another example of the procedure of decoding the data frame in the 3GPP standard generated in the procedure of FIG. 10 described above.

In the decoding procedure illustrated in FIG. 10 described above, the decoding of the first FEC is performed using all the likelihood information of each encoded symbol, but in the example 10, the first reception processing unit 204 or the second reception processing unit 202 calculates the statistical value of the likelihood information for each encoded symbol. On the basis of the statistical value, the likelihood information used for decoding of the first FEC is selected in units of encoded symbols, and the decoding of the first FEC is performed using only the selected likelihood information. In the example of FIG. 25, an average value of likelihood information is calculated for each encoded symbol as a statistical value. For example, an average value of four pieces of likelihood information $\Gamma_1$, $\Gamma_2$, $\Gamma_3$, and $\Gamma_4$ is calculated for the leftmost encoded symbol, and an average value of four pieces of likelihood information $\Gamma_5$, $\Gamma_6$, $\Gamma_7$, and $\Gamma_8$ is calculated for the second encoded symbol from the left. The average value is compared with the threshold, and the decoding of the first FEC is performed using the likelihood information of the encoded symbols having the average values greater than or equal to the threshold. In the example of FIG. 25, since the average value of the likelihood information of the second encoded symbol from the left is less than the threshold, the likelihood information of this encoded symbol is not used. By not using the encoded symbol having the likelihood information with a low average value as described above for decoding of the first FEC, the success rate of decoding of the first FEC can be improved. In this example, the average value is used as the statistical value, but a median value, a minimum value, a maximum value, a standard deviation, or the like may be used.

Example 11

Figure 26:
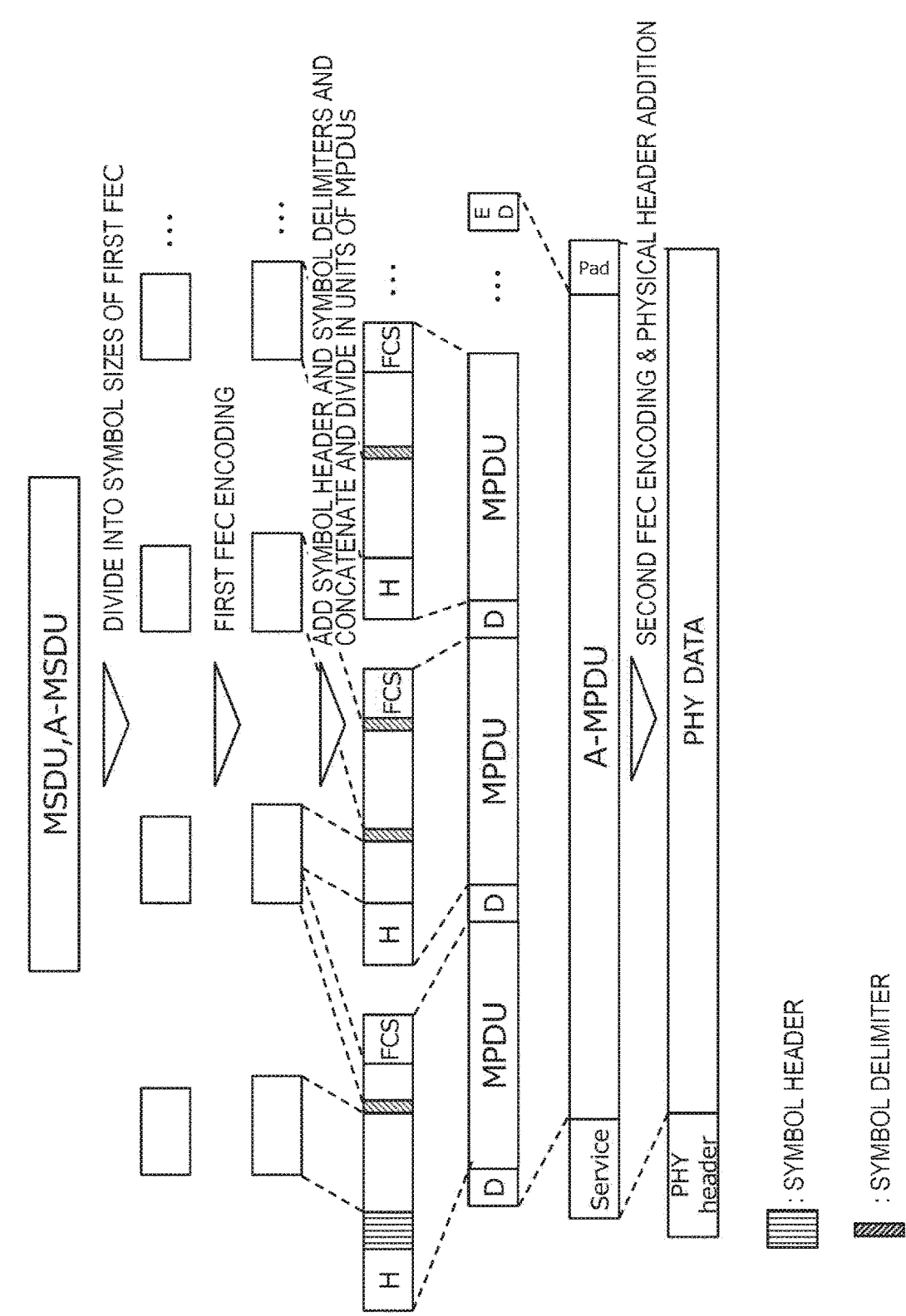
FIG. 26 is a diagram illustrating an example of a procedure of generating a data frame in the IEEE 802.11 standard by using two-stage FEC encoding.

FIG. 26 illustrates an example of a procedure of generating a data frame in the IEEE 802.11 standard using two-stage FEC encoding (encoding of the first FEC and encoding of the second FEC).

Figure 27:
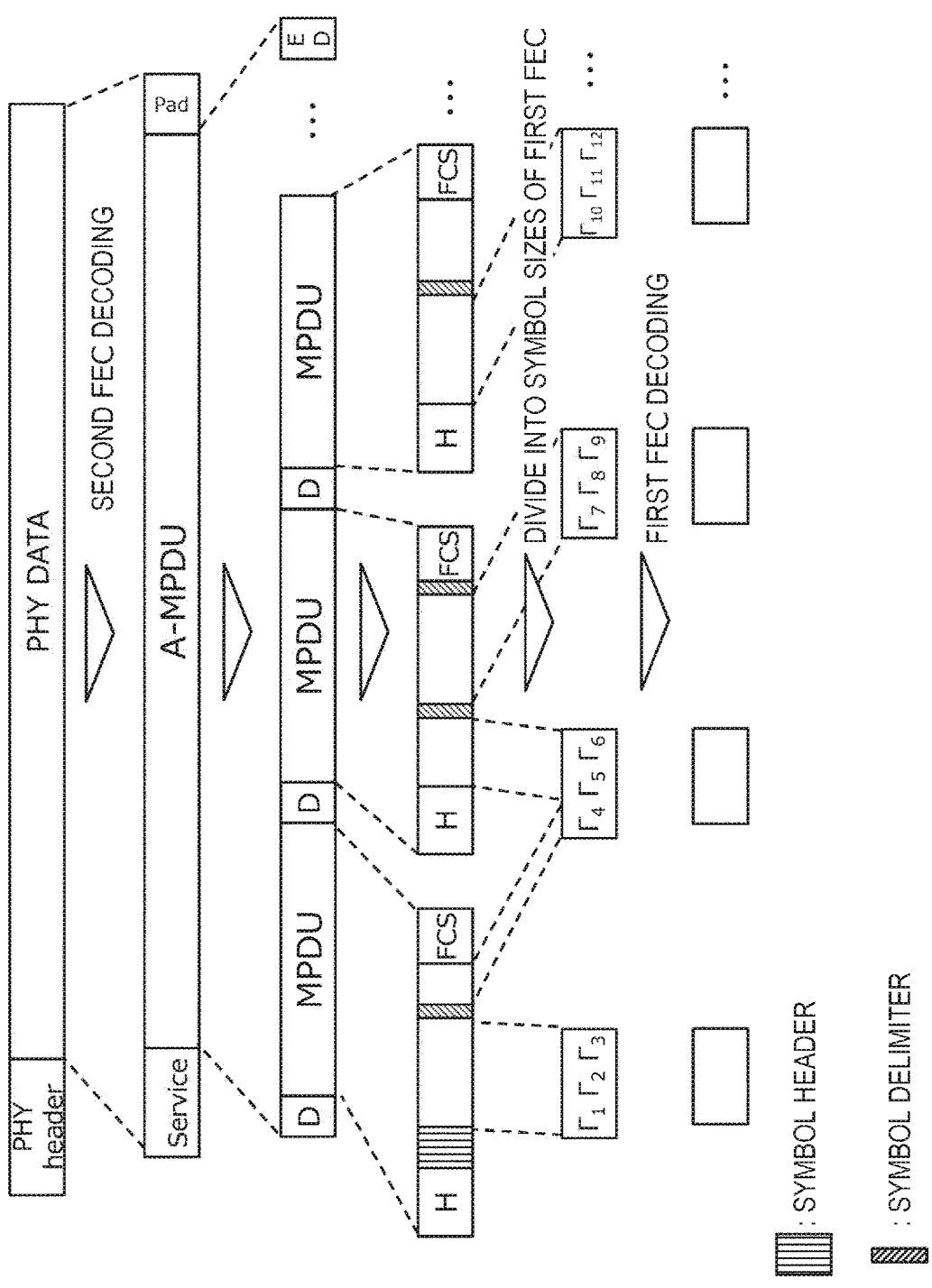
FIG. 27 is a diagram illustrating an example of a procedure of decoding a data frame generated by the procedure of FIG. 26 according to the present embodiment.

FIG. 27 illustrates an example of a procedure of decoding the data frame generated by the procedure of FIG. 26 according to the present embodiment.

In FIG. 26, in the transmission device 100, input data to be transmitted is divided into MAC protocol data units (MPDU) which are retransmission units, and is set as an MSDU or an A-MSDU.

The transmission device 100 divides the input data to be transmitted into the symbol sizes of the first FEC. The transmission device 100 generates encoded symbols of the first FEC by performing encoding (erasure correction coding) of the first FEC on the symbols obtained by the division.

The transmission device 100 generates main body data of an MPDU by at least partially dividing and concatenating encoded symbols on the basis of the length of the MPDU. At this time, a symbol header is added to the first encoded symbol, and symbol delimiters are added to the heads of the other encoded symbols. As a result, the main body data of the first MPDU includes the symbol header, the first encoded symbol, the symbol delimiter (including information indicating the boundary between the first and second encoded symbols), and the head side part of the second encoded symbol. Furthermore, the main body data of the second MPDU includes the remaining portion of the second encoded symbol, a symbol delimiter (including information indicating the boundary between the second and third encoded symbols), the third encoded symbol, and a symbol delimiter (including information indicating a boundary between the third and fourth encoded symbols).

The transmission device 100 generates an MPDU by adding an MPDU header ("H" in the drawing), an FCS, and the like to the main body data. The transmission device 100 adds an MPDU delimiter ("D" in the drawing) including information indicating a boundary between MPDUs to a head of each MPDU. The MPDU delimiter may include information other than a boundary between the MPDUs, for example, a destination of a data frame or the like. A plurality of MPDUs is concatenated via MPDU delimiters, and an MPDU delimiter ("ED" in the drawing) indicating the end is added to the end of the concatenated MPDUs. Therefore, an aggregated MPDU (A-MPDU) is generated. The symbol header or the MPDU delimiter may be included as part of the MPDU header. Further, a configuration in which FCS is not added is also possible.

The transmission device 100 adds a service field ("Service" in the drawing) and padding data ("Pad" in the drawing) to the A-MPDU. The encoding of the second FEC is performed on the A-MPDU to which the service field and the padding data are added.

A data frame is generated by adding a physical header to the A-MPDU after encoding of the second FEC. The data frame is transmitted by the transmission device 100.

The generation example of the data frame illustrated in FIG. 26 is an example, and various other examples are possible. For example, one or both of the symbol header and the symbol delimiter may not be used. Furthermore, a configuration in which division and concatenation of coded data are not performed is also possible. Further, the coded data of the first FEC may be larger than the size of the main body portion of the MPDUs. Also in this case, the coded data of the first FEC is only required to be divided and concatenated to generate data according to the size of the main body portion of the MPDUs.

In FIG. 27, the reception device 200 that has received the data frame first performs decoding of the second FEC on the basis of the physical header.

The reception device 200 divides the A-MPDU obtained by the decoding of the second FEC into units of MPDUs on the basis of the MPDU delimiters.

The reception device 200 determines the FCS of each MPDU and acquires the main body data from the MPDUs (obtained by removing the MPDU headers and the FCSs from the MPDUs). The main body data is divided into a plurality of fragments on the basis of the symbol headers and the symbol delimiters of the main body data. The plurality of fragments is at least partially concatenated to obtain a plurality of encoded symbols (fragments matching the length of the encoded symbol are acquired as is as encoded symbols). In addition, bitwise likelihood information is obtained for each encoded symbol.

In the example of FIG. 27, the leftmost MPDU is divided into two fragments on the basis of the symbol header and the symbol delimiter of the MPDU. The head side fragment matches the length of the encoded symbol, and the likelihood information ($\Gamma_1\Gamma_2\Gamma_3$) of the fragment is acquired as the likelihood information of the first encoded symbol as is. The likelihood information ($\Gamma_4$) of the end side fragment is concatenated with the likelihood information ($\Gamma_5\Gamma_6$) of the head side fragment of the subsequent second MPDU to obtain the likelihood information of the second encoded symbol. Similarly, likelihood information of the third and subsequent encoded symbols is also acquired.

The reception device 200 performs decoding of the first FEC using the bitwise likelihood information of all the encoded symbols. In a case where the decoding of the first FEC is successful, the reception device 200 provides data obtained by the decoding of the first FEC to the higher layer processing unit 201. Furthermore, the reception device 200 transmits an acknowledgement response (ACK) to the transmission device. In a case where there is an error in the data obtained by the decoding of the first FEC, that is, in a case where all the errors cannot be corrected, the reception device 200 transmits a retransmission request to the transmission device 100 using an acknowledgement response (NACK). As an example, the retransmission request is transmitted for the encoded symbols whose results of the FCS determinations are NG. Alternatively, the process is performed on the encoded symbols corresponding to a data portion of which an error has not been corrected in the data. The encoded symbols for transmitting the retransmission request may be decided by another method. In this example, the likelihood information of all the encoded symbols is used, but the decoding of the first FEC may be performed using only the likelihood information of the encoded symbols of which the statistical values are greater than or equal to the threshold using the technique illustrated in FIG. 25.

As described above, according to the present embodiment, in a wireless network or a wireless LAN of a cellular mobile communication, the likelihood information obtained from the decoding result of the second FEC in the physical layer is provided to the data link layer. Then, in the data link layer, decoding of a code word different from the code word of the second FEC (decoding of the first FEC) is performed using the likelihood information. At this time, not only the likelihood information of the data (encoded symbols) which is successfully decoded in the second FEC but also the likelihood information of the data which is not successfully decoded in the second FEC is used. Therefore, the application effect of the erasure correction code, that is, the possibility of successfully decoding of the first FEC can be improved. Thus, a latency caused by retransmission can be suppressed, and highly reliable communication can be realized.

Furthermore, according to the present embodiment, the decoding of the first FEC is performed without using the likelihood information of the encoded symbols having low reliability of the likelihood information (for example, the average value of the likelihood information is lower than the threshold). Therefore, the success rate of the decoding of the first FEC can be improved, and more reliable communication and low-latency communication can be realized.

(Hardware Configuration)

Figure 28:
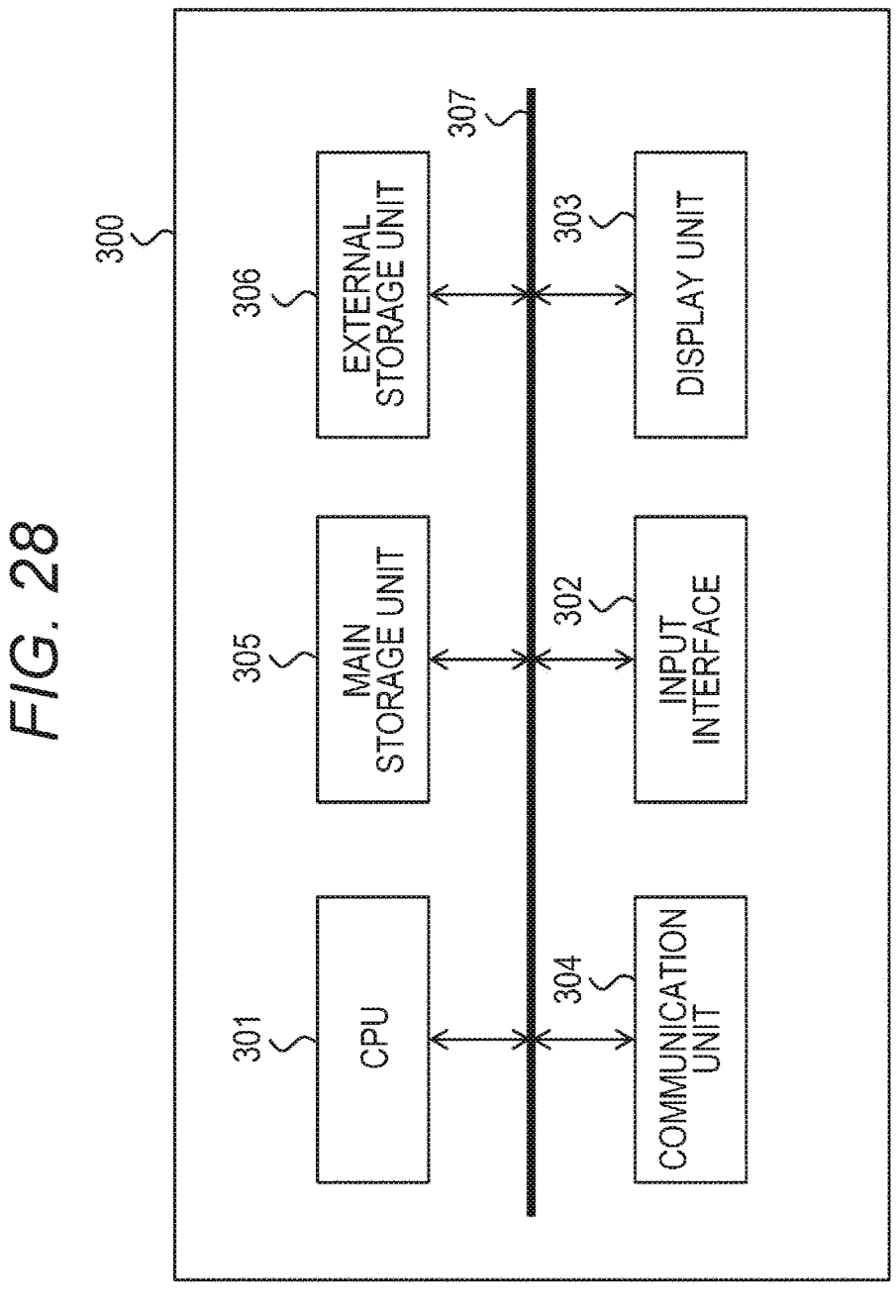
FIG. 28 illustrates an example of a hardware configuration of the information processing device according to the present embodiment.

FIG. 28 illustrates an example of a hardware configuration of the information processing device according to the present embodiment. The information processing device includes a computer device 300. The information processing device corresponds to the transmission device 100 or the reception device 200. The computer device 300 includes a CPU 301, an input interface 302, a display unit 303, a communication unit 304, a main storage unit 305, and an external storage unit 306, which are connected to each other via a bus 307. A part of the configuration illustrated in FIG. 28 may not be present. For example, the display unit 303 or the input interface 302 may not be present. Furthermore, elements other than the configuration illustrated in FIG. 28 may be present. For example, there may be a battery that supplies power to each element, or a sensor device such as a camera, a microphone, or the like.

The central processing unit (CPU) 301 executes a computer program on the main storage unit 305. The computer program is a program that implements each of the above-described functional configurations of the information processing device. The computer program may be implemented not by one program but by a combination of a plurality of programs and scripts. The CPU 301 executes the computer program to implement each functional configuration.

The input interface 302 is a circuit for inputting an operation signal from an input device such as a keyboard, a mouse, a touch panel, and the like to the information processing device.

The display unit 303 displays data stored in the information processing device or data calculated by the information processing device. The display unit 303 is, for example, a liquid crystal display (LCD), an organic electroluminescence display, a cathode ray tube (CRT), or a plasma display (PDP), but is not limited thereto.

The communication unit 304 is a circuit for the information processing device to communicate with an external device in a wireless or wired manner. Data used in the information processing device can be input from an external device via the communication unit 304. The communication unit 304 includes an antenna. Data input from an external device can be stored in the main storage unit 305 or the external storage unit 306.

The main storage unit 305 stores a computer program, data necessary for execution of the computer program, data generated by execution of the computer program, and the like. The computer program is developed and executed on the main storage unit 305. The main storage unit 305 is, for example, RAM, DRAM, or SRAM, but is not limited thereto.

The external storage unit 306 stores a computer program, data necessary for execution of the computer program, data generated by execution of the computer program, and the like. These computer programs and data are read into the main storage unit 305 when the computer program is executed. The external storage unit 306 is, for example, a hard disk, an optical disk, a flash memory, or a magnetic tape, but is not limited thereto.

Note that the computer program may be installed in the computer device 300 in advance or may be stored in a storage medium such as a CD-ROM and the like. Furthermore, the computer program may be uploaded on the Internet.

Furthermore, the computer device 300 may be configured as a single device, or may be configured as a system including a plurality of computer devices connected to each other.

Note that the above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are included in the invention described in the claims and the equivalent scope thereof.

Furthermore, the effects of the present disclosure described in the present specification are merely examples, and other effects may be provided.

Note that the present disclosure can also have the following configurations.

Item 1

An information processing device including:
a first processing unit that performs decoding in a first protocol layer and provides likelihood information obtained by the decoding to a second protocol layer; and
a second processing unit that performs decoding in the second protocol layer on the basis of the likelihood information.

Item 2

The information processing device according to item 1,
in which the first processing unit acquires bitwise likelihood information of coded data of a first code by performing decoding of a second code on data encoded by the first code and further encoded by the second code, and
the second processing unit performs decoding of the first code on the basis of the likelihood information.

Item 3

The information processing device according to item 2,
in which the first processing unit acquires the likelihood information of an encoded symbol of the first code.

Item 4

The information processing device according to item 3,
in which the first processing unit divides the data into a plurality of fragments and performs the decoding of the second code for each of the plurality of fragments to acquire the likelihood information.

Item 5

The information processing device according to item 4,
in which the first processing unit detects a delimiter including information for identifying a boundary between encoded symbols from a fragment of the plurality of fragments, and
the first processing unit acquires the likelihood information of the encoded symbol by performing at least one of division or concatenation at least partially on the likelihood information corresponding to the plurality of fragments on the basis of the delimiter.

Item 6

The information processing device according to item 5, further including
a second processing unit that performs processing of the second protocol layer,
in which the delimiter includes an address of a transmission destination of the data, and
the second processing unit does not perform the decoding of the first code in a case where the address included in the delimiter is different from an address of the information processing device.

Item 7

The information processing device according to any one of items 4 to 6, further including
a second processing unit that performs processing of the second protocol layer,
in which the data includes a header including information regarding encoding with the first code, and
the first processing unit detects a boundary between encoded symbols of the first code by using the information included in the header, and acquires the likelihood information of the encoded symbol by performing at least one of division or concatenation at least partially on the likelihood information corresponding to the plurality of fragments on the basis of the boundary detected.

Item 8

The information processing device according to item 7,
in which the header includes an address of a transmission destination of the data, and
the second processing unit does not perform the decoding of the first code in a case where the address included in the header is different from an address of the information processing device.

Item 9

The information processing device according to any one of items 3 to 8, further including
a second processing unit that performs processing of the second protocol layer,
in which the second processing unit performs the decoding of the first code on the basis of the likelihood information,
the first processing unit or the second processing unit calculates a statistical value of the likelihood information of the encoded symbol, and
the first processing unit or the second processing unit selects the likelihood information to be used for the decoding of the first code on the basis of the statistical value.

Item 10

The information processing device according to item 9,
in which the statistical value is an average value of the likelihood information, and
the first processing unit or the second processing unit selects the likelihood information in which the average value is greater than or equal to a threshold.

Item 11

The information processing device according to any one of items 4 to 10, in which a fragment of the plurality of fragments is a code block in a 3GPP standard.

Item 12

The information processing device according to any one of items 2 to 10, in which the data includes a MAC frame.

Item 13

The information processing device according to any one of items 2 to 12, in which the first code is an erasure correction code, and the second code is a convolutional code, a turbo code, an LDPC code, or a polar code.

Item 14

A decoding method including:

performing decoding in a first protocol layer and providing likelihood information obtained by the decoding to a second protocol layer; and performing decoding in the second protocol layer on the basis of the likelihood information.

REFERENCE SIGNS LIST

11 Macro cell
12 Small cell
13 Macro cell base station
14 Small cell base station
15 Control entity
16 Core network
18 External network
19 HeNB gateway device
20 Gateway device
100 Transmission device
101 Higher layer processing unit
102 First transmission processing unit
103 First FEC encoding unit
104 Second transmission processing unit
105 Second FEC encoding unit
106 Communication unit
108 Antenna
200 Reception device
201 Higher layer processing unit
202 Second reception processing unit (second processing unit)
203 First FEC decoding unit
204 First reception processing unit (first processing unit)
205 Second FEC decoding unit
206 Communication unit
208 Antenna
300 Computer device
302 Input interface
303 Display unit
304 Communication unit
305 Main storage unit
306 External storage unit
307 Bus

The invention claimed is:

1. An information processing device, comprising:
a central processing unit (CPU) configured to:
   decode, in a first protocol layer, a data frame;
   acquire, based on the decode of the data frame, decoded data that includes a plurality of pieces of coded data of a first code, wherein
      the plurality of pieces of coded data includes a first piece of coded data of the first code,
      the first piece of coded data is associated with one of:
         a result of a cyclic redundancy check (CRC) determination, or
         a result of a frame check sequence (FCS) determination, and
      one of the result of the CRC determination or the result of the FCS determination indicates a failure;
   determine, based on the decode of the data frame, a first plurality of pieces of likelihood information associated with the plurality of pieces of coded data, wherein the first plurality of pieces of likelihood information includes a first piece of likelihood information associated with the first piece of coded data;
   transmit the first plurality of pieces of likelihood information to a second protocol layer; and
   decode, in the second protocol layer, the first plurality of pieces of likelihood information.

2. The information processing device according to claim 1, wherein the CPU is further configured to:
   decode the data frame based on a second code;
   determine, based on the decode of the data frame, a plurality of pieces of bitwise likelihood information associated with the plurality of pieces of coded data of the first code, wherein
      the first plurality of pieces of likelihood information includes the plurality of pieces of bitwise likelihood information, and
      the data frame is encoded by the first code and further encoded by the second code; and
   decode, based on the first code, the first plurality of pieces of likelihood information.

3. The information processing device according to claim 2, wherein
   the plurality of pieces of coded data includes a second piece of coded data, and
   the second piece of coded data includes an encoded symbol of the first code.

4. The information processing device according to claim 3, wherein the CPU is further configured to:
   divide the data frame into a plurality of fragments;
   decode, based on the second code, each fragment of the plurality of fragments; and
   determine, based on the decode of each fragment of the plurality of fragments, a second plurality of pieces of likelihood information.

5. The information processing device according to claim 4, wherein
   the plurality of fragments includes a fragment including a plurality of encoded symbols of the first code,
   the plurality of encoded symbols includes the encoded symbol of the first code,
   the CPU is further configured to:
      detect a delimiter including information, wherein the information indicates a boundary between the plurality of encoded symbols;
      at least one of partially divide or partially concatenate the second plurality of pieces of likelihood information based on the delimiter; and determine a second piece of likelihood information of the first plurality of pieces of likelihood information based on the at least one of the partial division or the partial concatenation of the second plurality of pieces of likelihood information, and the second piece of likelihood information is associated with the encoded symbol of the first code.

6. The information processing device according to claim 5, wherein the CPU is further configured to:

execute an operation of the second protocol layer, wherein the delimiter further includes an address of a transmission destination of the data frame; and prohibit the decode of the data frame in a case where the address, in the delimiter, is different from an address of the information processing device.

7. The information processing device according to claim 4, wherein the CPU is further configured to:

execute an operation of the second protocol layer, wherein the data frame includes a header including information, and the information indicates that the data frame is encoded with the first code;

detect, based on the information in the header, a boundary between a plurality of encoded symbols of the first code, wherein the plurality of encoded symbols includes the encoded symbol of the first code;

at least one of partially divide or partially concatenate the second plurality of pieces of likelihood information based on the detected boundary; and determine a second piece of likelihood information of the first plurality of pieces of likelihood information based on the at least one of the partial division or the partial concatenation of the second plurality of pieces of likelihood information, and the second piece of likelihood information is associated with the encoded symbol of the first code.

8. The information processing device according to claim 7, wherein the header further includes an address of a transmission destination of the data frame, and the CPU is further configured to prohibit the decode of the data frame in a case where the address, in the header, is different from an address of the information processing device.

9. The information processing device according to claim 4, wherein the plurality of fragments includes a fragment, and the fragment is a code block in a 3rd Generation Partnership Project (3GPP) standard.

10. The information processing device according to claim 3, wherein the CPU is further configured to:

execute an operation of the second protocol layer, wherein the first plurality of pieces of likelihood information includes a second piece of likelihood information associated with the encoded symbol of the first code;

determine a statistical value of the second piece of likelihood information of the encoded symbol; and select, based on the determined statistical value, the second piece of likelihood information for the decode of the second piece of likelihood information, and the decode of the second piece of likelihood information is based on the first code.

11. The information processing device according to claim 10, wherein the statistical value is an average value of the second piece of likelihood information, and the CPU is further configured to:

determine that the average value of the second piece of likelihood information is one of greater than or equal to a threshold; and select the second piece of likelihood information based on the determination that the average value is one of greater than or equal to the threshold.

12. The information processing device according to claim 2, wherein the data frame includes a medium access control (MAC) frame.

13. The information processing device according to claim 2, wherein the first code is an erasure correction code, and the second code is one of a convolutional code, a turbo code, a low density parity check (LDPC) code, or a polar code.

14. A decoding method, comprising:

decoding, in a first protocol layer, a data frame;

acquiring, based on the decoding of the data frame, decoded data that includes a plurality of pieces of coded data of a specific code, wherein the plurality of pieces of coded data includes a specific piece of coded data of the specific code, the specific piece of coded data is associated with one of:

a result of a cyclic redundancy check (CRC) determination, or a result of a frame check sequence (FCS) determination, and one of the result of the CRC determination or the result of the FCS determination indicates a failure;

determining, based on the decoding of the data frame, a plurality of pieces of likelihood information associated with the plurality of pieces of coded data, wherein the plurality of pieces of likelihood information includes a specific piece of likelihood information associated with the specific piece of coded data;

transmitting the plurality of pieces of likelihood information to a second protocol layer; and decoding, in the second protocol layer, the plurality of pieces of likelihood information.

* * * * *